(12) United States Patent
Seim et al.

(10) Patent No.: US 12,469,476 B2
(45) Date of Patent: Nov. 11, 2025

(54) PASSIVE HAPTIC TRAINING SYSTEM AND METHODS

(71) Applicant: Georgia Tech Research Corporation, Atlanta, GA (US)

(72) Inventors: Caitlyn Seim, Atlanta, GA (US); Thad Eugene Starner, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 289 days.

(21) Appl. No.: 18/306,179

(22) Filed: Apr. 24, 2023

(65) Prior Publication Data
US 2023/0343310 A1    Oct. 26, 2023

Related U.S. Application Data

(60) Provisional application No. 63/333,956, filed on Apr. 22, 2022, provisional application No. 63/333,960, filed on Apr. 22, 2022.

(51) Int. Cl.
*G10G 1/02*       (2006.01)
*G09B 15/00*      (2006.01)

(52) U.S. Cl.
CPC .............. *G10G 1/02* (2013.01); *G09B 15/00* (2013.01)

(58) Field of Classification Search
CPC .................................. G10G 1/02; G09B 15/00
See application file for complete search history.

(56) References Cited

U.S. PATENT DOCUMENTS

| | | | | |
|---|---|---|---|---|
| 6,388,182 B1 * | 5/2002 | Bermudez | ............ | G09B 15/026 84/478 |
| 6,541,687 B1 * | 4/2003 | Miyamoto | ............. | G09B 15/08 84/600 |
| 9,326,909 B2 * | 5/2016 | Liu | ......................... | A63B 22/00 |
| 10,121,388 B2 * | 11/2018 | Seim | ................... | G09B 21/003 |
| 10,488,929 B2 * | 11/2019 | Kim | ......................... | G06F 3/01 |
| 10,782,786 B2 * | 9/2020 | Kim | ...................... | A63F 13/285 |
| 11,024,274 B1 * | 6/2021 | Williams | ............. | G10H 1/0025 |
| 11,037,537 B2 * | 6/2021 | Huo | ....................... | G10H 3/125 |

(Continued)

OTHER PUBLICATIONS

Eugenia Costa-Giomi, Patricia J. Flowers, andWakaha Sasaki. 2005. Piano Lessons of Beginning Students Who Persist or Drop Out: Teacher Behavior, Student Behavior, and Lesson Progress. Journal of Research in Music Education 53, 3 (Oct. 2005), 234-247. https://doi.org/10.1177/002242940505300305 Publisher: SAGE Publications Inc.

(Continued)

*Primary Examiner* — Robert W Horn
(74) *Attorney, Agent, or Firm* — Meunier Carlin & Curfman LLC

(57) ABSTRACT

Exemplary systems and wearable haptic device systems are disclosed for training a user to improve perception or discrimination. An exemplary system can be used to train a user to play a musical instrument, such as a piano, in passive training sessions via a wearable haptic device. The exemplary wearable haptic device can be integrated with sensors and in operative communication with a passive haptic learning system (e.g., cloud-based infrastructure) that is configured to generate, update, and/or modify tactile training data for generating tactile outputs at the wearable haptic device.

21 Claims, 10 Drawing Sheets

(56) References Cited

U.S. PATENT DOCUMENTS

| | | | | |
|---|---|---|---|---|
| 2011/0112672 | A1* | 5/2011 | Brown | G11B 27/28 |
| | | | | 700/94 |
| 2013/0303951 | A1* | 11/2013 | Liu | A63B 23/16 |
| | | | | 601/46 |
| 2015/0317910 | A1* | 11/2015 | Daniels | G09B 9/00 |
| | | | | 434/257 |
| 2023/0343310 | A1* | 10/2023 | Seim | G09B 15/00 |
| 2025/0005931 | A1* | 1/2025 | Maezawa | G10D 3/00 |

OTHER PUBLICATIONS

Michael Scott Cuthbert and Christopher Ariza. 2010. music21: A toolkit for computer-aided musicology and symbolic music data. (2010).

Rumen Donchev, Erik Pescara, and Michael Beigl. 2021. Investigating Retention in Passive Haptic Learning of Piano Songs. Proceedings of the ACM on Interactive, Mobile, Wearable and Ubiquitous Technologies 5, 2 (Jun. 2021), 60:1-60:14. https://doi.org/10.1145/3463513.

Kevin Huang, Ellen Yi-Luen Do, and Thad Starner. 2008. PianoTouch: A wearable haptic piano instruction system for passive learning of piano skills. In 2008 12th IEEE International Symposium on Wearable Computers. 41-44. https://doi.org/10.1109/ISWC.2008.4911582 ISSN: 2376-8541.

Kevin Huang, Thad Starner, Ellen Do, Gil Weiberg, Daniel Kohlsdorf, Claas Ahlrichs, and Ruediger Leibrandt. 2010. Mobile music touch: mobile tactile stimulation for passive learning. In Proceedings of the 28th international conference on Human factors in computing systems—CHI '10. ACM Press, Atlanta, Georgia, USA, 791. https://doi.org/10.1145/1753326.1753443.

Joel J. Katz, Momo Ando, and Melody Wiseheart. 2021. Optimizing song retention through the spacing effect. Cognitive Research: Principles and Implications 6, 1 (Dec. 2021), 79. https://doi.org/10.1186/s41235-021-00345-7.

Daniel Kohlsdorf and Thad Starner. 2010. Mobile Music Touch: The effect of primary tasks on passively learning piano sequences. In International Symposium on Wearable Computers (ISWC) 2010. 1-8. https://doi.org/10.1109/ISWC.2010.5665877 ISSN: 2376-8541.

Herbert E. Krugman and Eugene L. Hartley. 1970. Passive Learning from Television. Public Opinion Quarterly 34, 2 (Jan. 1970), 184-190. https://doi.org/10.1086/267788.

Tanya Thais Markow. 2012. Mobile music touch: using haptic stimulation for passive rehabilitation and learning. Ph.D. Dissertation. Georgia Institute of Technology.

Karola Marky, Andreas Weiß, Andrii Matviienko, Florian Brandherm, Sebastian Wolf, Martin Schmitz, Florian Krell, Florian Müller, Max Mühlhäuser, and Thomas Kosch. 2021. Let's Frets! Assisting Guitar Students During Practice via Capacitive Sensing. In Proceedings of the 2021 CHI Conference on Human Factors in Computing Systems (CHI '21). Association for Computing Machinery, New York, NY, USA, 1-12. https://doi.org/10.1145/3411764.3445595.

Tríona McCaffrey and Jane Edwards. 2016. "Music Therapy Helped Me Get Back Doing": Perspectives of Music Therapy Participants in Mental Health Services. Journal of Music Therapy 53, 2 (2016), 121-148. https://doi.org/10.1093/jmt/thw002.

Marco Musy. 2022. PianoPlayer. https://github.com/marcomusy/pianoplayer original-date: 2017-10-16T17:25:47Z.

Saul B. Needleman and Christian D. Wunsch. 1970. A general method applicable to the search for similarities in the amino acid sequence of two proteins. Journal of molecular biology 48 3 (1970), 443-53.

Linsey Raymaekers, Jo Vermeulen, Kris Luyten, and Karin Coninx. 2014. Game of tones: learning to play songs on a piano using projected instructions and games. In CHI '14 Extended Abstracts on Human Factors in Computing Systems (CHI EA '14). Association for Computing Machinery, New York, NY, USA, 411-414. https://doi.org/10.1145/2559206.2574799.

Katja Rogers, Amrei Röhlig, Matthias Weing, Jan Gugenheimer, Bastian Könings, Melina Klepsch, Florian Schaub, Enrico Rukzio, Tina Seufert, and Michael Weber. 2014. P.I.A.N.O.: Faster Piano Learning with Interactive Projection. In Proceedings of the Ninth ACM International Conference on Interactive Tabletops and Surfaces (ITS '14). Association for Computing Machinery, New York, NY, USA, 149-158. https://doi.org/10.1145/2669485.2669514.

Caitlyn Seim. 2019. Wearable vibrotactile stimulation: How passive stimulation can train and rehabilitate. Ph.D. Dissertation. https://smartech.gatech.edu/handle/1853/61253 Accepted: 2019-05-29T14:03:08Z Publisher: Georgia Institute of Technology.

Caitlyn Seim, Tanya Estes, and Thad Starner. 2015. Towards Passive Haptic Learning of piano songs. In 2015 IEEE World Haptics Conference (WHC). 445-450. https://doi.org/10.1109/WHC.2015.7177752.

Cliff Zukin and Robin Snyder. 1984. Passive Learning: When the Media Environment Is the Message. Public Opinion Quarterly 48, 3 (Jan. 1984), 629-638. https://doi.org/10.1086/268864.

* cited by examiner (a) PASSIVE HAPTIC REHEARSAL GLOVES.
(b) WEB APP FOR ACTIVE AND PASSIVE PRACTICE.
(c) ACTIVE PRACTICE ON LIGHT-UP KEYBOARD

PASSIVE HAPTIC TRAINING SYSTEM AND METHODS

RELATED APPLICATION

This application claims priority to, and the benefit of, U.S. Provisional Patent Application No. 63/333,956, filed Apr. 22, 2022, entitled "PASSIVE HAPTIC TRAINING SYSTEM AND METHODS," and U.S. Provisional Patent Application No. 63/333,960, filed Apr. 22, 2022, entitled "PASSIVE HAPTIC TRAINING SYSTEM FOR MUSICAL INSTRUMENTS WITH AUTOMATIC LESSON CREATION AND MIXED PASSIVE PRACTICE," the contents of which are incorporated by reference herein in their entirety.

GOVERNMENT LICENSE RIGHTS

This invention was supported by the National Science Foundation, Partnerships for Innovation grant no. 2122797. The government has certain rights in the invention.

BACKGROUND

Haptic learning technology employs tactile feedback that can recreate the sense of touch by, for instance, applying a sensation (e.g., via forces, vibrations, and/or motions) to the user via a wearable, tactile interface. Passive Haptic Learning (PHL) refers to the acquisition of sensorimotor skills without active attention to learning (i.e., allowing a person to learn "muscle memory" through a sensory stimulus without devoting attention to the stimulus). The sensorimotor skills learned can relate to a variety of applications including, but not limited to, Braille, musical instruments, code-based systems, text-entry systems, rehabilitation, or the like. The stimulation can be designed to occur in the background of any task, including related tasks like active practice or unrelated tasks like driving, travel, chores, etc. The "passive" training time allows learning to be amplified without additional time devoted to focusing on the instrument.

Wearable computing systems are known to teach chorded input (e.g., Braille typing skills or piano playing) through sensory input (e.g., vibrational stimuli), with or without the active attention of the user.

There is, nevertheless, a benefit to improving Passive Haptic Learning for various commercial applications.

SUMMARY

An exemplary integrated passive training learning system and method are disclosed that employ passive haptics training in a multi-stage music teaching system having automatic lesson creation and mixed passive practice to automatically define passive tactile training data from music notations or musical files by identifying by one or more processors, e.g., via machine learning algorithms, repeated segments of musical symbols in the musical notation file or data object and assigning (e.g., via an assignment scheduler) tactile outputs at a wearable haptic device. The automatic lesson creation provides for mixed passive practice in which the lessons allocate (i) passive stimulation for background practice of any task, including related tasks like active practice or unrelated tasks like driving, travel, chores, etc., and (ii) active practice.

The music learning process can take significant time between (i) learning theory and technique and (ii) practicing new piano pieces and rehearsing previously learned ones. The "passive" training time allows learning through perception, recognition, and discrimination to be amplified without additional time devoted to focusing on the instrument, and the combination can speed up the learning process for complex music greater and increase retention compared to passive or active training alone.

The process of creating passive haptic learning lessons can be resource intensive, and that requires both piano skills and programming skills to respectively formulate the lesson and encode the lesson into a haptic device.

Another exemplary integrated passive haptic training (PHT) system and method are disclosed that employs passive haptics training that can be used for a variety of applications, including VR/AR training, music, new technology training, defense, and medicine using a corpus of stimuli that directly or indirectly convey the desired skill's components. The exemplary integrated passive haptics training system and method apply either (i) an actuator to each finger, at each joint, etc., so that each actuator indicates a body part or a discrete motion (e.g., extend elbow) or (ii) actuators in a configuration that conveys continuous motions, sensations, or information associated with a component of a skill. Through hours of PHT, the user not only learns the meaning of each signal but also improves their perception speed.

In an aspect, a computer-implemented method is disclosed (e.g., for generating tactile training data for training a user to learn to play a musical instrument (e.g., piano), for use in a therapy or treatment session, and/or to improve perception or discrimination) comprising: receiving, by one or more processors, a musical notation file or data object having musical symbols that indicate pitches, rhythms, or chords of a song or instrumental musical piece; generating, by the one or more processors, fingering position data for a musical instrument by: identifying, by the one or more processors, repeated segments of musical symbols in the musical notation file or data object; and determining at least one repeated segment having a pattern that meets one or more predefined static key constraints (fingering position) and/or one or more predefined dynamic key constraints (hand positioning) (e.g., via a score-to-actuation mapping engine); generating, by the one or more processors, tactile training data for at least one of the repeated segments by assigning (e.g., via an assignment scheduler) a predefined tactile value (e.g., high, medium, low) associated with tactile outputs at a wearable haptic device (e.g., haptic glove or wearable patch), wherein the tactile training data includes a replication of at least one of the repeated segments; and storing, by the one or more processors, tactile training data in a database or local storage device, wherein the tactile training data is subsequently used to generate the tactile outputs at the wearable haptic device.

In some embodiments, the step of generating, by the one or more processors, fingering position data for the musical instrument further comprises: dividing the remaining content in the musical notation file or data object into segments surrounding the identified repeated segments.

In some embodiments, the step of identifying, by the one or more processors, repeated segments of musical symbols comprises: processing, by the one or more processors, the musical notation file or data object using a trained machine learning model (e.g., neural network) configured to classify the musical symbols as groups of symbols.

In some embodiments, the one or more predefined static key constraints comprise fingering position or hand size and the one or more predefined dynamic key constraints comprise hand positioning, hand spread, and/or hand movement information.

In some embodiments, the wearable haptic device is configured to adjust the tactile outputs to one of the predefined tactile values for the one or more predefined static key constraints, one or more predefined dynamic key constraints, and a plurality of global rules.

In some embodiments, the step of identifying, by the one or more processors, repeated segments of musical segments comprises processing, by the one or more processors, the musical notation file or data object using a trained machine learning model (e.g., neural network) that evaluates the musical symbols in the musical notation file or data object using a sliding window operation.

In some embodiments, the method further includes receiving, by the one or more processors, feedback data comprising at least one of audio sensor data, video sensor data, motion sensor data or bend sensor data obtained during an active training session; evaluating, by the one or more processors, a difference between (i) the pitches, rhythms, or chords of the musical notation file or data object and (ii) corresponding pitches, rhythms, or chords of the audio sensor data or video sensor data, wherein the determined difference is used to (i) modify, by the one or more processors, the stored tactile training data for a future lesson (e.g., modify a stored lesson or lesson order) or (ii) generate additional tactile training data for a new lesson.

In some embodiments, evaluating the difference comprises converting, by the one or more processors, at least a portion of the feedback data into musical symbol data, pitch data, rhythm data, and/or chord data that is compared to the musical symbol data, pitch data, rhythm data, and/or chord data of the musical notation file or data object.

In some embodiments, evaluating the difference comprises performing, by the one or more processors, a sequence matching operation (e.g., identifying timing differences and/or alignment differences that meet or exceed a pre-determined threshold) on at least a portion of the musical notation file or data object and the feedback data.

In some embodiments, the tactile training data includes 10-25 actions (e.g., 15-17 actions, e.g., being an optimal duration for piano) for a passive training session (e.g., wherein the number of actions is adjustable based on a measured ratio of passive training sessions to active training sessions).

In some embodiments, the wearable haptic device comprises one or more gloves that each comprise a set of actuators that are associated with a target location of the user's hand (e.g., dorsal phalanges).

In some embodiments, the wearable haptic device comprises one or more wearable devices that each comprise a set of one or more actuators.

In another aspect, a system for training a user to learn how to play a musical instrument (e.g., piano) for use in a therapy or treatment session and/or to improve perception or discrimination comprising: at least one wearable haptic device (e.g., glove) comprising a plurality of actuators; and a controller (e.g., mobile device, local controller, or remote computing device) operatively coupled to the at least one wearable haptic device that is configured to: obtain tactile training data for a user of the at least one wearable haptic device, wherein the tactile training data comprises: (i) fingering position data for a musical instrument, (ii) a replication of at least one repeated segment of musical symbols in a musical notation file or data object having symbols that indicate pitches, rhythms, or chords of a song or instrumental musical piece, and (iii) a predefined tactile value (high, medium, low) associated with tactile outputs at the wearable haptic device.

In some embodiments, the fingering position data is determined by: identifying repeated segments of musical symbols in the musical notation file or data object, and determining at least one repeated segment having a pattern that meets one or more predefined static key constraints (fingering position) and/or one or more predefined dynamic key constraints (hand positioning).

In some embodiments, the one or more predefined static key constraints comprise fingering position or hand size and the one or more predefined dynamic key constraints comprise hand positioning, hand spread, or hand movement information.

In some embodiments, the wearable haptic device is configured to adjust the tactile outputs to one of the predefined tactile values for the one or more predefined static key constraints, one or more predefined dynamic key constraints, and a plurality of global rules.

In some embodiments, the controller is further configured to: receive feedback data comprising audio sensor data or video sensor data obtained during an active training session; and evaluate a difference between (i) the pitches, rhythms, or chords of the musical notation file or data object and (ii) corresponding pitches, rhythms, or chords of the audio sensor data or video sensor data, wherein the determined difference is used to (i) modify the stored tactile training data for a future lesson or (ii) generate additional tactile training data for a new lesson.

In some embodiments, evaluating the difference comprises performing a sequence matching operation (e.g., identifying timing differences and/or alignment differences that meet or exceed a pre-determined threshold) on at least a portion of the musical notation file or data object and the feedback data.

In some embodiments, the tactile training data includes 10-25 actions (e.g., 15-17 actions, e.g., being an optimal duration for piano) for a passive training session (e.g., wherein the number of actions is adjustable based on a measured ratio of passive training sessions to active training sessions).

In some embodiments, the at least one wearable haptic device comprises a first wearable glove comprising a first set of actuators, and a second wearable glove comprising a second set of actuators.

In some embodiments, each actuator is configured to stimulate a target area of the user's hands (e.g., dorsal phalanges).

In another aspect, a method is disclosed for training a user to sense and/or understand signals from a haptic user interface (e.g., prosthetic limb), the method comprising: providing a corpus of haptic signals from the haptic user interface and their meanings and forming this information into a digital file; programming and building an external haptic interface to replicate these haptic signals upon the command of a training program; segmenting, by one or more processors attached to the haptic user interface capable of replicating the signals, the corpus into tactile training lessons including one or more signals; generating, by the haptic user interface capable of replicating the signals, tactile training signals for each segment of the corpus, wherein the signals are repeated for more than 15 minutes per segment; and associating each tactile training lesson's signals with the meaning of the signal(s), via the external haptic interface's visual display, audio display, or instructions one or more times during each training segment.

In another aspect, a system is disclosed for training a user to improve perception or discrimination comprising: at least one wearable haptic device (e.g., glove) comprising a plurality of actuators; and a controller (e.g., mobile device, local controller, or remote computing device) operatively coupled to the at least one wearable haptic device that is configured to: obtain tactile training data for a user of the at least one wearable haptic device, and generate, via the plurality of actuators, outputs at the at least one wearable haptic device based at least on the tactile training data, wherein the tactile training data comprises at least one repeated pattern of vibrations or pulses corresponding with a plurality of signals or cues.

In some embodiments, the systems, methods, and apparatuses disclosed herein can be used to facilitate music-related learning (including, for instance, sight recognition, sound recognition, music reading, and musical-instrument playing). In some embodiments, the music-related learning involves newly learning how to play music on an instrument. In some embodiments, the musical-related learning involves enhancing and/or advancing skills related to an already-learned musical instrument (e.g., enhancing speed of playing or speed of learning a new song or portion thereof, increased number or volume of musical notes and/or chords learned). Examples of musical instruments whose playing can be facilitated through the systems, methods, and apparatuses disclosed herein can include, but are not limited to, wind instruments (e.g., flute), string instruments (e.g., guitar), percussion instruments (e.g., drums), brass instruments (e.g., trumpet), electronic instruments (e.g., synthesizer), and keyboard instruments (e.g., piano). The musical instruments whose playing can be facilitated through the systems, methods, and apparatuses disclosed herein can include, but are not limited to, idiophones (e.g., directly struck idiophones, indirectly struck idiophones, plucked idiophones, friction idiophones, blown idiophones), membranophones (e.g., struck membranophones, plucked membranophones, friction membranophones, singing membranophones), chordophones (e.g., simple chordophones, zithers (e.g., bar zithers, stick zithers, tube zithers, raft zithers, board zithers, trough zithers, frame zithers), composite chordophones (e.g., lutes, harps, harp lutes)), electrophones, and acrophones (e.g., free aerophones, non-free aerophones (e.g., flutes, reed aerophones, trumpets)). Further examples of musical instruments whose playing can be facilitated through the systems, methods, and apparatuses disclosed herein can include, but are not limited to, piano, guitar, xylophone, marimba, drums, organ, horns, bagpipes, harmonica, clarinet, flute, trumpet, saxophone, oboe, piccolo, recorder, tuba, harp, banjo, mandolin, and ukulele. In some embodiments, portions of music are taught. In some embodiments, entire pieces of music are taught. In some embodiments, wherein the chorded input involves multiple limbs, the music can be taught in individual limbs sequentially. In some embodiments, wherein the chorded input involves multiple limbs, the music can be taught in multiple limbs simultaneously (e.g., two-hands for piano at once time).

In some embodiments, the systems, methods, and apparatuses disclosed herein can be used to teach words, letters, phrases, or combinations thereof to facilitate language-related learning (including, for instance, sight recognition, sound recognition, reading, writing, and verbal comprehension). In some embodiments, the language-related learning involves newly learning a language or portion thereof. In some embodiments, the language-related learning involves enhancing and/or advancing skills related to an already-learned language (e.g., enhancing speed of reading, writing, and/or comprehending; increased number or volume of words, letters, and/or phrases learned). Examples of language-related learning that can be facilitated through the systems, methods, and apparatuses disclosed herein can include, but are not limited to, English, Korean, Mandarin, Cantonese, Hindi, Spanish, Arabic, Portuguese, Bengali, Russian, Japanese, Punjabi, German, Javanese, Wu, Malay, Telugu, Vietnamese, French, Marathi, Tamil, Urdu, Persian, Turkish, Italian, Thai, Gujarati, Jin, Min Nam, Polish, Pashto, Kannada, Xiang, Malayalam, Sundanese, Hausa, Dutch, Greek, Czech, Swahili, Afrikaans, Oriya, Burmese, Hakka, Ukrainian, Bhojpuri, Tagalog, Yoruba, Maithili, Swahili, Uzbek, Sindhi, Amharic, and Fula. In some embodiments, the systems, methods, and apparatuses disclosed herein can be used to facilitate the use of a language in a particularized function, such as stenography. In some embodiments, the language-based skills can be conveyed to teach typing. In some embodiments, the language-based skills can be conveyed to teach reading. Language-based skills can be taught, in some embodiments, via incremental use with a pangram.

In some embodiments, the systems, methods, and apparatuses disclosed herein can be used to teach words, letters, phrases, codes, or combinations thereof to facilitate code-related learning (including, for instance, sight recognition, sound recognition, reading, writing, and verbal comprehension). In some embodiments, the code-related skills involve rhythm and/or temporally based systems. In some embodiments, the code-related learning involves newly learning a code or portion thereof. In some embodiments, the code-related learning involves enhancing and/or advancing skills related to an already-learned code (e.g., enhancing speed of reading, writing, and/or comprehending; increased number or volume of words, letters, and/or phrases learned). Examples of code-related learning that can be facilitated through the systems, methods, and apparatuses disclosed herein can include, but are not limited to, Braille and Morse code. In some embodiments, the Morse code is taught via tap input for text entry on for instance, a mobile device. In some embodiments, Morse code is taught using just audio (which may result in passive learning of text entry).

In some embodiments, the systems, methods, and apparatuses disclosed herein can be used to facilitate rehabilitation. For instance, the rehabilitation can include motor skill rehabilitation related to injury, disability, birth defect, aging, or a combination thereof. In some embodiments, the rehabilitation includes increasing sensory perception in individuals suffering from paralysis.

In some embodiments, the systems, methods, and apparatuses disclosed herein can be used in any application using a haptic interface, which includes, but is not limited to, teleoperation, flight simulation, simulated training, dance, simulated combat, gaming controllers, gaming add-ons for augmented reality, computer-based learning systems, and text-entry systems. In some embodiments, muscle memory is taught via the conveyance of chorded input. In some embodiments, machine and/or system control is taught via conveyance of chorded input.

In some embodiments, the conveyance incorporates use of a wearable device. The wearable device can include, in some embodiments, a glove system including one or more gloves. In some embodiments, the wearable device can include a smart phone, a smart watch, a mobile phone, a computer, an electrostimulation unit, a wearable patch, a wearable fitness unit (e.g., FITBIT®, JAWBONE®UP), and/or a visual aid accessory (e.g., GOOGLE®GLASS).

BRIEF DESCRIPTION OF THE DRAWINGS

The skilled person in the art will understand that the drawings described below are for illustration purposes only.

DETAILED SPECIFICATION

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the nth reference in the list. All references cited and discussed in this specification are incorporated herein by reference in their entirety and to the same extent as if each reference was individually incorporated by reference.

Example Systems

Figure 1A:
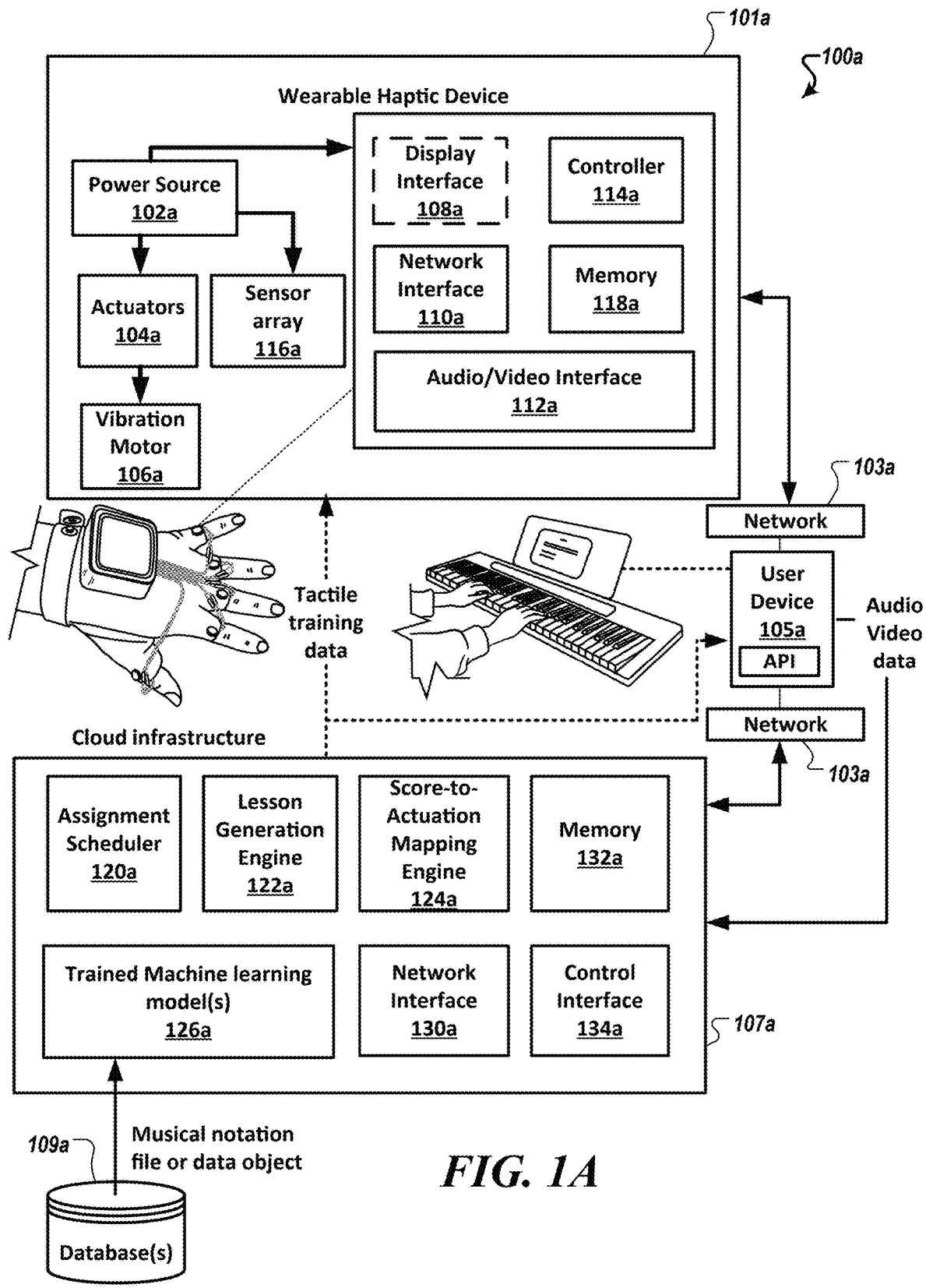
FIG. 1A is a schematic diagram depicting an exemplary system for generating tactile training data for training a user to learn to play a musical instrument in accordance with an exemplary embodiment.

FIG. 1A is a schematic diagram depicting an exemplary system 100 (shown as 100a) for generating tactile training data for training a user to learn to play a musical instrument in accordance with exemplary embodiments.

Example Wearable Haptic Device. As shown in FIG. 1A, the system 100a includes a wearable haptic device 101a that is in operable communication with a user device 105a and a cloud infrastructure 107a over a network 103a. The wearable haptic device 101a is or comprises a haptic user interface that is configured to convey information, such as signal status, cues, or messages, via haptics (e.g., by outputting vibrations and/or force). In various embodiments, the wearable haptic device 101a can comprise one or more gloves, a wearable sleeve, combinations thereof, and/or the like, as described herein.

The wearable haptic device 101a includes a power source 102a (e.g., battery pack) configured to provide energy to one or more actuators 104a or a vibration motor 106a, a sensor array 116a, a display interface 108a, network interface 110a, audio/video interface 112a, controller 114a, and memory 118a. As depicted, the wearable haptic device 101a includes a controller 114a in operable communication with the wearable haptic device 101a and is configured to interface with the actuators 104a and/or vibration motor 106a, and the sensor array 116a. The controller 114a is configured to receive tactile training data (e.g., from the cloud infrastructure 107a and/or user device 105a) for generating tactile outputs by the wearable haptic device 101a via the actuators 104a and/or the vibration motor 106a. The controller 114a may be in operable communication with the user device 105a (e.g., tablet, mobile device, computing device). In some implementations, the controller 114a is configured to obtain sensor data via the sensor array 116a and transmit the sensor data to the cloud infrastructure 107a and/or user device 105a for modifying or updating the tactile training data, as discussed in more detail below.

Example Cloud Infrastructure or Remote Computing Resource. The system 100a includes a cloud infrastructure or remote computing resource (collectively shown as "Cloud Infrastructure" 107) that is in operable communication with the wearable haptic device 101a and the user device 105a. As further depicted, the cloud infrastructure 107a includes a network interface 130a, memory 132a, and control interface 134a for facilitating operations of the cloud infrastructure 107a. The cloud infrastructure 107a is configured to receive, from a database 109a, a musical notation file or data object having musical symbols that indicate pitches, rhythms, or chords of a song or instrumental musical piece and can process the musical notation file or data object to generate tactile training data for generating outputs at the wearable haptic device 101a. As shown, the cloud infrastructure 107a comprises a plurality of elements, including an assignment scheduler 120a, a lesson generation engine 122a, a score-to-actuation mapping engine 124a, and one or more trained machine learning models 126a that can be used to process the musical notation file or data object.

Example User Device. As noted above, the system 100a includes a user device 105a. The user device 105a may be or comprise a computing device, mobile device, laptop, tablet, wearable device, musical instrument, and/or the like. In some implementations, the user device 105a is configured to retrieve the tactile training data from the cloud infrastructure 107a (e.g., via an application programming interface) and provide the tactile training data to the wearable haptic device 101a. Each of the wearable haptic device 101a and the user device 105a can obtain sensor data from a user, for example, feedback data comprising at least one of audio sensor data, video sensor data obtained via the user device 105a and/or motion sensor data or bend sensor data obtained via the sensor array 116a of the wearable haptic device 101a. In some implementations, the user device 105a can locally store tactile training data, and the wearable haptic device 101a may retrieve the tactile training data from the user device 105a.

Figure 1B:
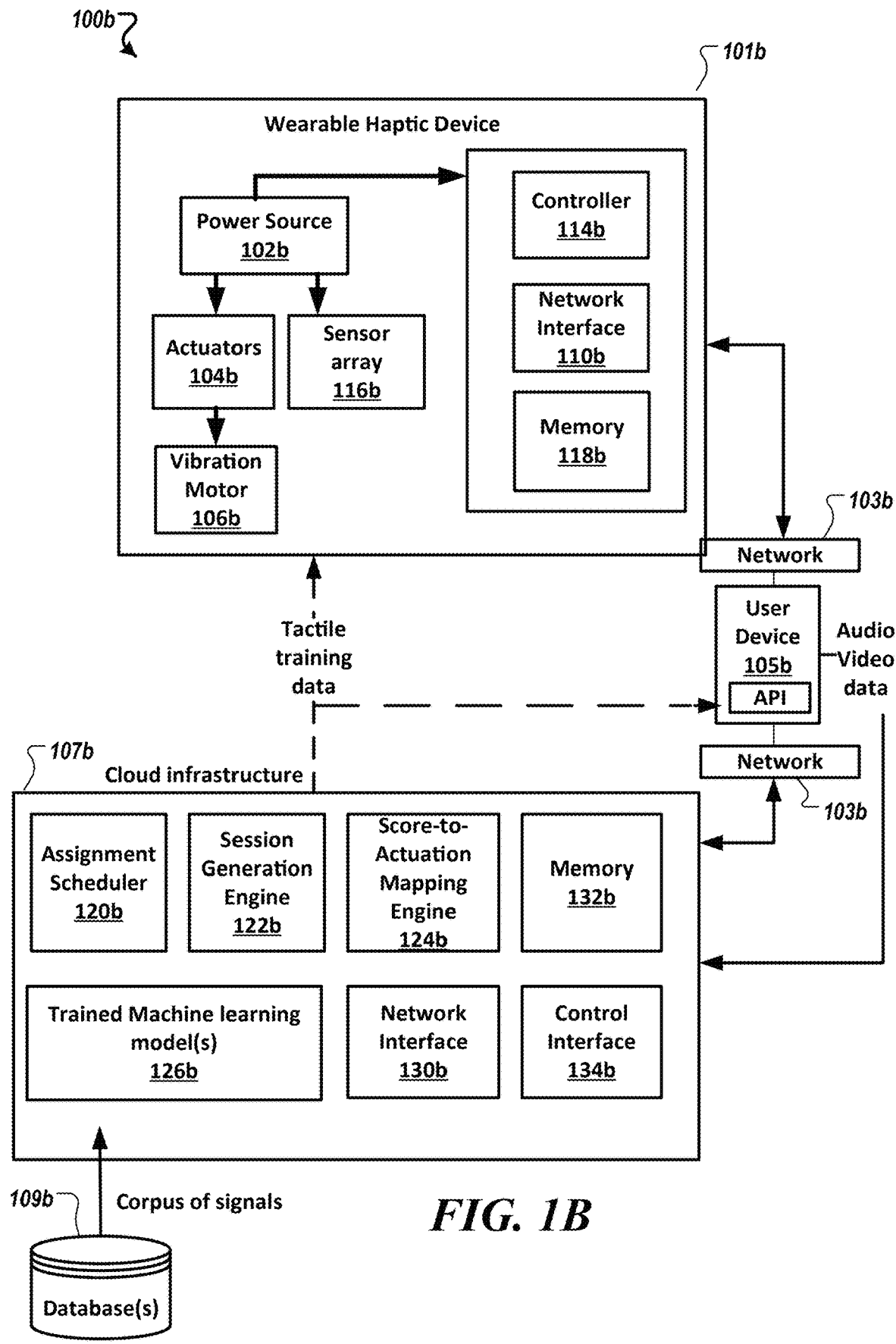
FIG. 1B is a schematic diagram depicting another exemplary system for generating tactile training data for training a user in a therapy or treatment session and/or to improve perception or discrimination in accordance with an exemplary embodiment.

FIG. 1B is a schematic diagram depicting an exemplary system 100 (shown as 100b) for generating tactile training data for training a user to improve perception or discrimination in accordance with exemplary embodiments.

Example Wearable Haptic Device. As shown in FIG. 1B, the system 100b includes a wearable haptic device 101b that is in operable communication with a user device 105b and a cloud infrastructure 107b over a network 103b. The wearable haptic device 101b is or comprises a haptic user interface that is configured to convey information, such as signal status, cues, or messages, via haptics (e.g., by outputting vibrations and/or force). The wearable haptic device 101b can comprise a prosthetic device, wearable patch, combinations thereof, and/or the like.

The wearable haptic device 101b includes a power source 102b (e.g., battery pack) configured to provide energy to one or more actuators 104b, a vibration motor 106b, a sensor array 116b, a display interface 108b, network interface 110b, audio/video interface 112b, controller 114b, and memory 118b. As depicted, the wearable haptic device 101b includes a controller 114b in operable communication with the wearable haptic device 101b that is configured to interface with the actuators 104b/vibration motor 106b, and sensor array 116b. The controller 114b is configured to receive tactile training data (e.g., from the cloud infrastructure 107b and/or user device 105b) for generating tactile outputs by the wearable haptic device 101b (e.g., corresponding with a status signal, cue, message, or the like) via the actuators 104b and/or the vibration motor 106b. The controller 114b is in operable communication with the user device 105b (e.g., tablet, mobile device, computing device). In some implementations, the controller 114b is configured to obtain sensor data via the sensor array 116b and transmit the sensor data to the cloud infrastructure 107b and/or user device 105b for modifying or updating the tactile training data as discussed in more detail below.

Example Cloud Infrastructure. The system 100b includes a cloud infrastructure 107b that is in operable communication with the wearable haptic device 101b and the user device 105b. As further depicted, the cloud infrastructure 107b includes a network interface 130b, memory 132b, and control interface 134b for facilitating operations of the cloud infrastructure 107b. The cloud infrastructure 107b is configured to receive, from a database 109b, a data object describing signals and their meanings. The cloud infrastructure 107b can generate tactile training data for generating outputs at the wearable haptic device 101b (e.g., prosthetic limb). The tactile training data can comprise at least one repeated pattern or vibrations or pulses corresponding with a plurality of signals or cues. As shown, the cloud infrastructure 107b comprises a plurality of elements, including an assignment scheduler 120b, a session generation engine 122b, a score-to-actuation mapping engine 124b, and one or more trained machine learning models 126b that can be used to generate tactile training data for training a user to sense or understand signals.

Example User Device. As noted above, the system 100b includes a user device 105b, such as a computing device, mobile device, laptop, tablet, wearable device, and/or the like. In some implementations, the user device 105b is configured to retrieve the tactile training data from the cloud infrastructure 107b (e.g., via an application programming interface) and provide the tactile training data to the wearable haptic device 101b. Each of the wearable haptic device 101b and the user device 105b can obtain sensor data from a user, for example, feedback data comprising at least one of audio sensor data, video sensor data obtained via the user device 105b and/or motion sensor data or bend sensor data obtained via the sensor array 116b of the wearable haptic device 101b. In some implementations, the user device 105b can locally store tactile training data, and the wearable haptic device 101b may retrieve the tactile training data from the user device 105b.

Example Wearable Haptic Glove

Figure 2A:
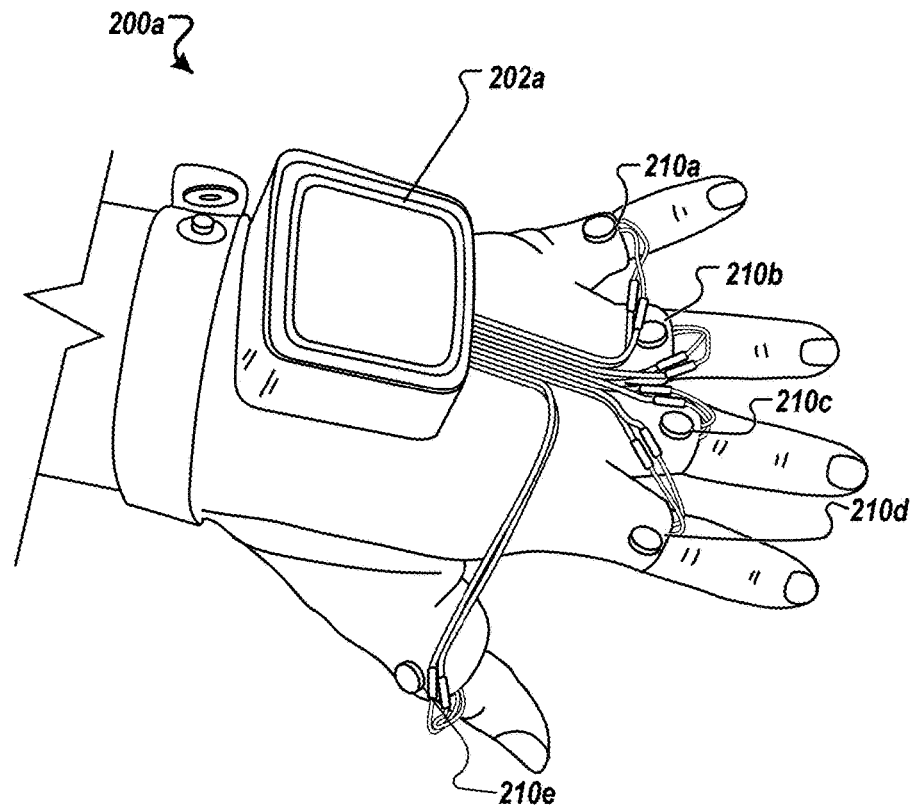
FIG. 2A and FIG. 2B are schematic diagrams depicting example wearable haptic devices according to illustrative embodiments.
Figure 2B:
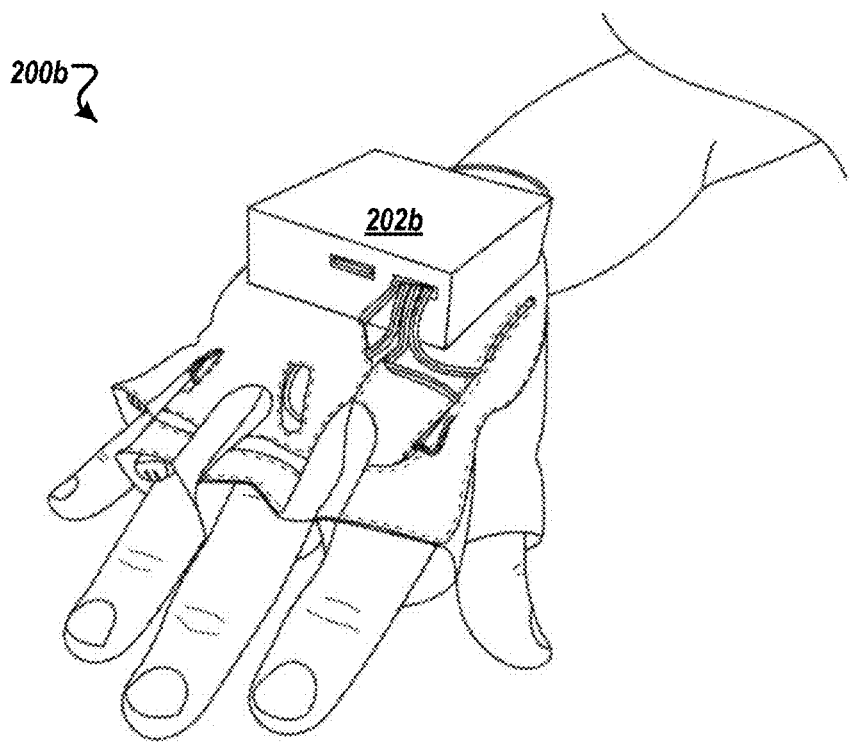

FIG. 2A and FIG. 2B are schematic diagrams depicting example wearable haptic devices/gloves (shown as 200a and 200b, respectively) that can be used to train a user to learn to play a musical instrument (e.g., piano). It should be understood that a system may comprise two wearable gloves in operable communication with one another, where a first wearable glove is a primary device that is also configured to control the operations of a second wearable haptic glove. In some embodiments, each wearable glove may operate independently with respect to one another.

As shown in FIG. 2A, the wearable haptic glove 200a comprises a plurality of vibration motors/actuators 210a, 210b, 210c, 210d, and 210e that are each configured to provide stimulation to a respective finger of the user's hand. Additionally, the wearable haptic glove 200a comprises a housing 202a located on the top surface of the wearable haptic glove 200a that is configured to house various electrical components, for example, a power source 102a, a controller 114a (e.g., microcontroller), display interface 108a, network interface 110a, audio/video interface 112a, and memory 118a described above in connection with FIG. 1A. The plurality of vibration motors/actuators 210a, 210b, 210c, 210d, and 210e can be in wired communication (as shown) or wireless communication with a controller located in the housing 202a. The wearable haptic glove 200a can also include a sensor array 116a configured to obtain sensor data (e.g., feedback data such as motion sensor data or bend sensor data) from the user of the wearable haptic glove 200a. For example, the sensor array 116a may comprise one or more sensors located on each respective finger area of the wearable haptic glove 200a (e.g., corresponding with a respective vibration motor/actuator). The sensor array 116a can comprise pressure sensors, motion sensors, bend sensors, flex sensors, combinations thereof, and the like.

The wearable haptic glove 200a is configured to generate control signals (e.g., via controller 114a) that drive the plurality of vibration motors/actuators 210a, 210b, 210c, 210d, and 210e. Each of the plurality of vibration motors/actuators 210a, 210b, 210c, 210d, and 210e is configured to provide stimulation (e.g., pulses and/or vibrations) of different strengths (e.g., strong vibration, medium vibration, gentle vibration) corresponding with tactile training data for a particular task. The vibration strength may increase proportionally with an amount of applied voltage. Each of the plurality of vibration motors/actuators 210a, 210b, 210c, 210d, and 210e can be configured to stimulate a target area of the user's hand, such as, but not limited to, the user's dorsal phalanges.

FIG. 2B shows another example view of a wearable haptic glove 200a. The wearable haptic glove 200b may be similar or identical to the wearable haptic glove 200a discussed above in connection with FIG. 2A. As shown, the wearable haptic device 200b comprises a housing 202b configured to house various electrical components (e.g., power source 102a, controller 114a, and the like).

Additional description of an example wearable haptic devices/gloves is provided in U.S. Pat. No. 10,121,388, which is hereby incorporated by reference herein in its entirety.

Example Passive Haptic Training System

Change perception, recognition, discrimination: Another exemplary integrated passive haptic training (PHT) system and method are disclosed that employs passive haptics training that can be used for a variety of applications, including VR/AR training, music, new technology training, defense, and medicine using a corpus of stimuli that directly or indirectly convey the desired skill's components. The exemplary integrated passive haptics training system and method apply either (i) an actuator to each finger, at each joint, etc., so that each actuator indicates a body part or a discrete motion (e.g., extend elbow) or (ii) actuators in a configuration that conveys continuous motions, sensations, or information associated with a component of a skill. Through hours of PHT, the user not only learns the meaning of each signal, but also improves their perception speed.

The passive haptic training may be used to improve perception of stimuli for later. Similarly, passive haptic training may be applied for stimuli-based teaching or practice, but in this case, stimuli are samples of what the user needs to perceive or recognize. For example, a new prosthetic allows a user to control a robotic device and provides 4 channels (for example) of feedback to the skin (or in another example, the brain through electrical stimuli).

Patterns sent via these 4 channels can indicate different device conditions or force feedback. And, instead of hours of practicing with the robotic device, passive haptic training can be used to train on artificial feedback. During such a case, the device can be designed to have a Passive Haptic Training (PHT) setting in which it provides signals or sets of signals via the 4 feedback channels with the associated meaning. Through hours of PHT, the user not only learns the meaning of each signal but also improves their perception speed.

In an example, the device can provide instructional (convey information, change perception/discrimination/recognition) haptic stimuli. The device can repeat these stimuli for a training period. In some embodiments, the device is but a part of a larger device (i.e., a brain implant) that has a primary purpose(s) such as receiving information, but it is also capable of providing PHT stimuli (e.g., to rapidly train the user to understand signals from the device).

In another example, the device can be used for learning or training by providing haptic (tactile, proprioceptive, etc.) stimuli designed to convey information (e.g., indicate movements, send data, teach patterns, teach codes or keys, gameplay, routines). The device can repeat these stimuli for a training period. In some embodiments, the device includes means for training through stimulation only, e.g., without waiting for feedback from the user during a given training session. In some embodiments, the device is designed so training stimuli can occur in the background of rest, driving, work, travel, or any other task.

In another example, the device can be used for learning or training by providing haptic (e.g., tactile, proprioceptive, etc.) stimuli designed to change perception or discrimination (e.g., train different auditory tones, improve the recognition of tactile patterns).

The device can repeat these stimuli for a training period.

In another aspect, the device can be used for learning or training by providing haptic (tactile, proprioceptive, etc.) stimuli mixed to both change perception or discrimination and convey information (e.g., improve identification of tactile patterns, and convey meaning for each one). The device can repeat these stimuli for a training period.

In some embodiments, the stimulation can include mixed audio and haptic. In some embodiments, the stimulation is mixed with other methods. Stimulation can include auditory, electrical, tactile, proprioceptive, kinesthetic, visual, smell, taste, and other senses.

In another embodiment, an exemplary method can be used to teach skills via repeated haptic stimuli, e.g., as described above. Proprioceptive, kinesthetic information can be used in combination or as a substitute for haptics.

In another aspect, the device and/or method can be used to teach a set of information/actions/sensory information by breaking the desired set of information into PHT lessons that are part of the set. In some embodiments, the PHT lessons can have a repeating structure so that Lesson 1 is first, then Lesson 2 is next, then Lesson 1+2 is next. The device can include other structures so that lessons are also repeated or combined at a prescribed schedule for better learning. In some embodiments, the lessons can be provided in a specific order. In other embodiments, the lessons are repeated between 2 and 360 times or higher. In some embodiments, the lessons are repeated between 1 minute and 3 hours. The time duration can be longer for a stronger effect. In some embodiments, the system that delivers the lesson on repeat for the preferred amount of repetitions. The lessons can be on-demand or in an order determined manually. The lessons can be in random order. The lessons or parts of lessons can be delivered based on performance. The device can be used as a closed-loop PHL system that senses performance and delivers stimuli or lessons based on that sensing. The lessons can be of a length or include between 1 and 20 stimuli, or it can be greater than 20.

In another aspect, the PHL system described above can be integrated into a wearable device.

Example Method of Operation of Passive Haptic Training System

FIG. 3A, FIG. 3B, FIG. 3C, FIG. 3D, and FIG. 3E are schematic diagrams depicting operational examples of systems in accordance with illustrative embodiments. The exemplary systems can be used in a number of applications, such as, but not limited to, augmented reality (AR) and virtual reality (VR) training, musical training, new technology training, defense, and medicine. For example, the exemplary system can be utilized in a commercial product for training a user to play a musical instrument (e.g., piano) or training a user to perform a medical procedure.

Figure 3A:
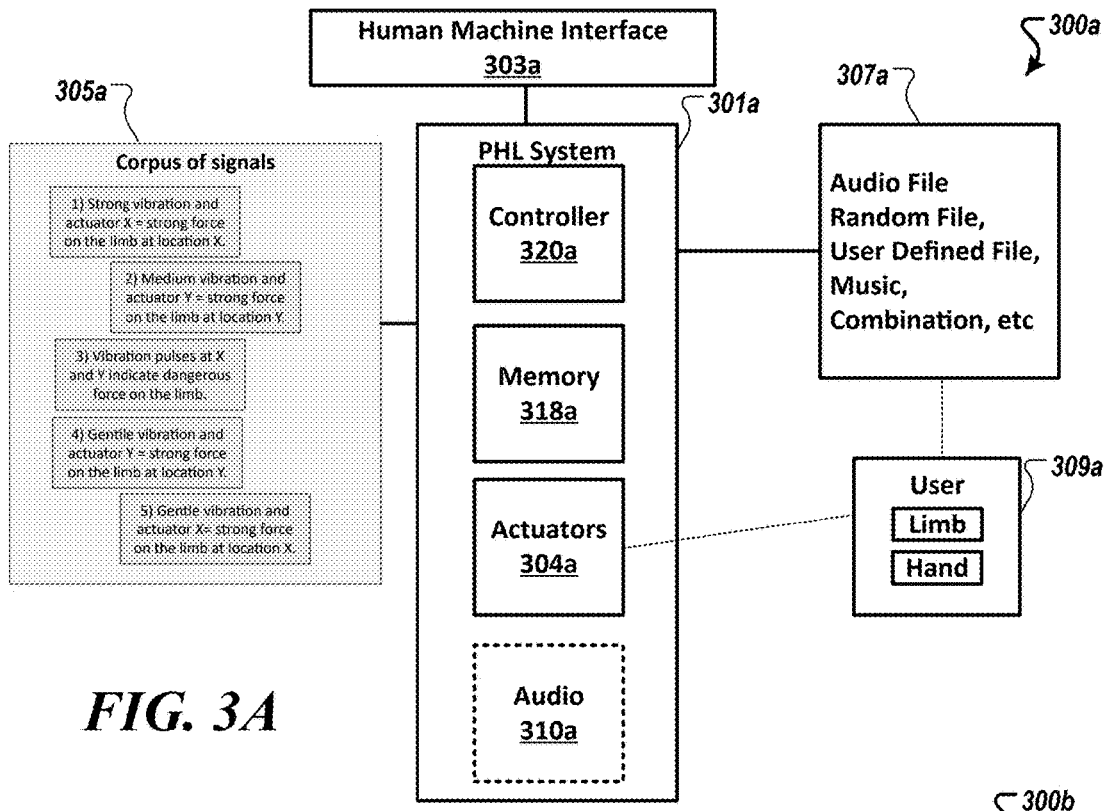
FIG. 3A, FIG. 3B, FIG. 3C, FIG. 3D, and FIG. 3E are schematic diagrams depicting operational examples of systems that include passive haptic learning systems in accordance with illustrative embodiments.

Referring now to FIG. 3A, an example system 300a includes a Passive Haptic Training system 301a and a Human Machine Interface 303a. As shown, the PHT system 301a comprises a controller 320a, a memory 318a, a plurality of actuators 304a, and, optionally, an audio interface 310a. The PHT system 301a can utilize actuator-to-action mapping to describe what actuator (cue location on the body) can be used to signal different actions. The user apparatus that applies the actuator 304a to the body is designed to deliver stimuli that are understandable to the user as indicative of action or information. Stimuli in the system may be designed specifically to instruct a skill. In various embodiments, the stimuli may convey the components of the skill (such as actions, movements, passwords, gestures, words, buttons, and meanings). Stimuli are not provided simply to excite or enhance motor control, as in passive haptic rehabilitation. Instead, a corpus of stimuli that directly or indirectly convey the skill's components is chosen. In another aspect, the PHT system described above can be integrated into user apparatus 309a (e.g., wearable device). The user apparatus 309a can include an actuator for each finger, joint, or the like. Each of the plurality of actuators 304a can thus be associated with a body part or a discrete motion (e.g., extend elbow). The actuators 304a can be configured to convey continuous motions, sensations, and/or information.

As shown, the actuators 304a are in operable communication with the user apparatus 309a configured to generate tactile outputs for a user's limb, hands, or the like. The PHT system 301a can retrieve a data object 307a comprising an audio file, random file, user defined file, music, combinations thereof, and or the like that can be used to generate tactile training data for the user apparatus 309a. The PHT system 301a can retrieve data from a corpus of signals 305a via the user interface (e.g., human-machine interface 303a) and form the data into a digital file. The corpus of signals 305a can be formed by using one or more sensors (e.g., motion sensors) to record haptic signals at an original device, test device, and/or musical instrument. The recordings can be translated into signals produced by a user apparatus 309a (e.g., wearable device), for example, through signal processing to identify timings, frequencies, amounts of force, and/or the like. The PHT system 301a can program and build an external haptic interface (e.g., human-machine interface 303a) capable of replicating the signals upon the command of a training program. The haptic user interface is configured to convey information, such as signal status, cues, messages, and/or the like, via haptics (e.g., vibrations, pulses, or forces). The PHT system 301a can segment the corpus of signals 305a into tactile training data or lessons, including one or more signals. The PHT system 301a can generate (e.g., via a haptic interface or human-machine interface 303a) tactile training signals for each segment of the corpus of signals 305a. In some examples, the tactile training signals are repeated for a predetermined time-period (e.g., 15 minutes or more per segment). Each tactile training lesson's signals can be associated with the meaning of the signal(s) via the external haptic interface's visual display, audio display, or instructions provided one or more times during each training segment.

Figure 3B:
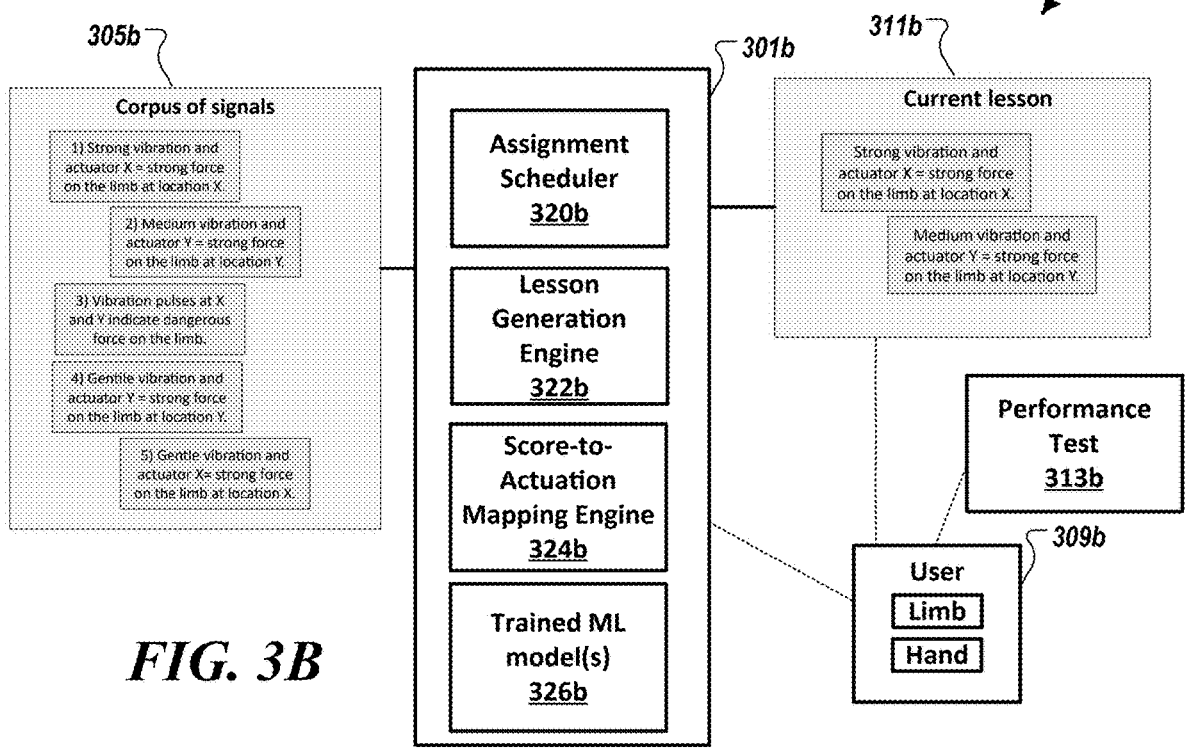

Referring now to FIG. 3B, an example architecture 300b that includes a PHT system 301b is depicted according to embodiments of the present disclosure. The PHT system 301b can be similar or identical to the cloud infrastructure 107a described in connection with FIG. 1A and can include an assignment scheduler 320b, lesson generation engine 322b, score-to-actuation mapping engine 324b, and one or more trained machine learning models 326b. The PHT system 301b can utilize actuator-to-action mapping (e.g., via the score-to-actuation mapping engine 324b) to describe what actuator (cue location on the body) can be used to signal different actions. As shown, the PHT system 301b can retrieve data from a corpus of signals 305b and form the data into a digital file. The corpus of signals 305b can be used to produce a lesson 311b for a user at a user apparatus 309b (e.g., wearable device), for example, by generating haptic/tactile outputs at the user's limb or hand(s). The user may subsequently take a performance test 313b via the user apparatus 309b, and the PHT system 103b can determine whether the user's performance on the performance test 313b meets or exceeds a performance threshold.

Figure 3C:
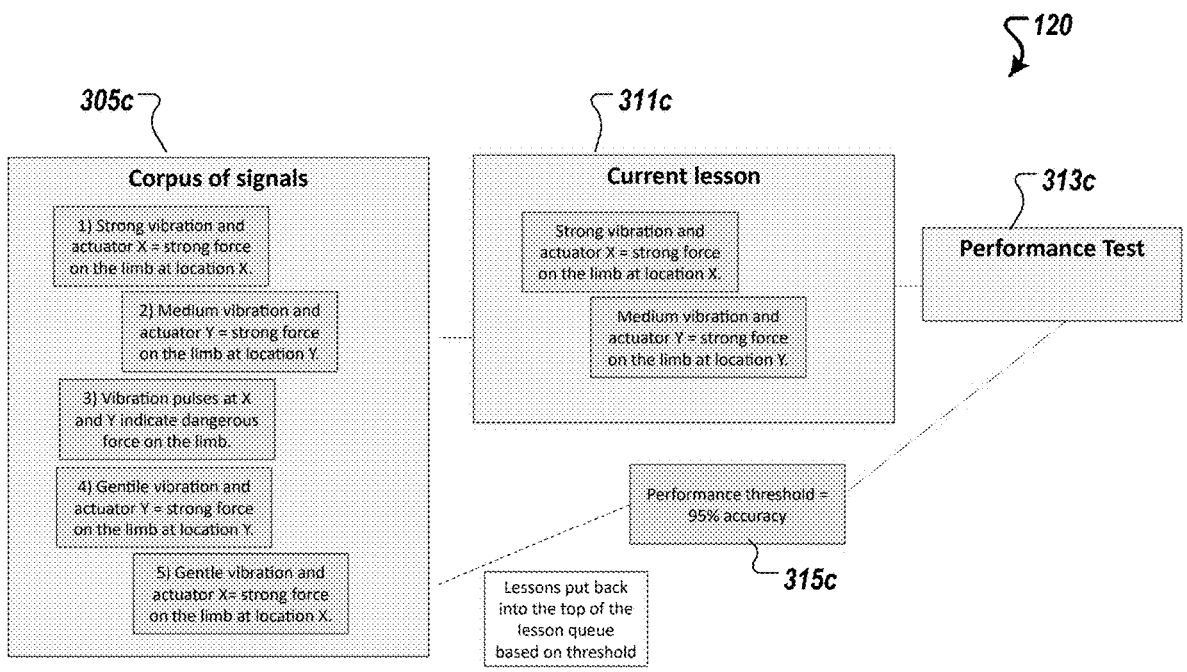

Referring now to FIG. 3C, operations of an example assignment scheduler 120 are depicted in accordance with exemplary embodiments. The assignment scheduler 120 can retrieve data from a corpus of signals 305c and form a lesson 311c for a user. The assignment scheduler 120 can then receive the results of a user's performance test 313c. In an instance in which performance test results fail to meet or exceed an accuracy threshold 315c, the assignment scheduler 120 can reorganize a lesson queue for the user (e.g., put one or more lessons at the top of a lesson queue based on the accuracy threshold 315c.

Figure 3D:
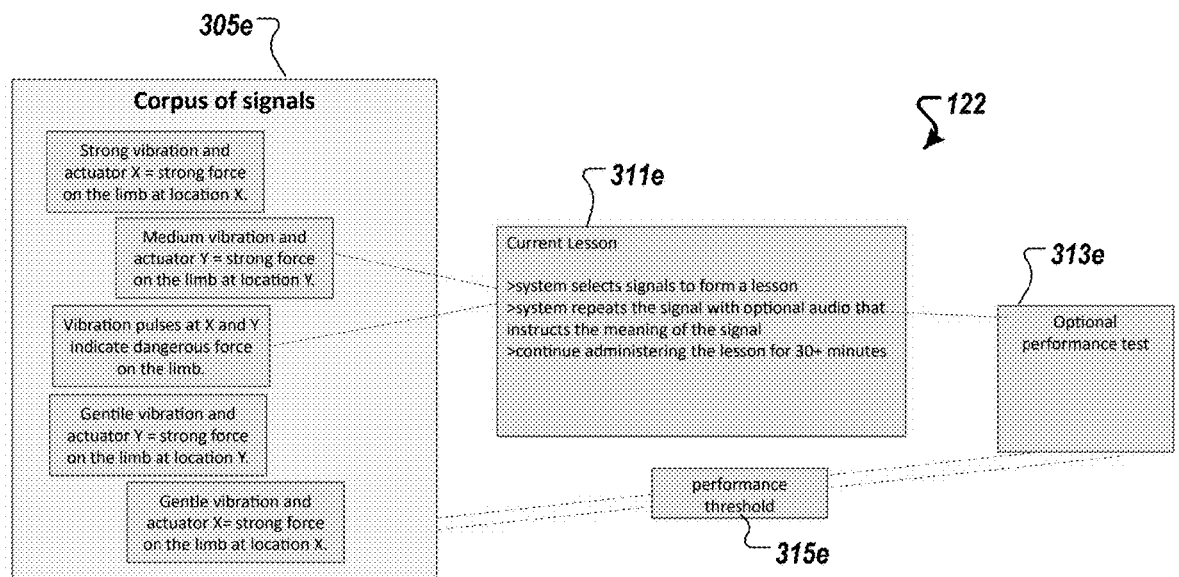

Referring now to FIG. 3D, operations of an example lesson generation engine 122 are depicted in accordance with exemplary embodiments. The lesson generation engine 122 can retrieve data from a corpus of signals 305e and form a current lesson 311e for a user. As depicted, the lesson generation engine 122 can select signal(s) from the corpus of signals 305e to form a lesson. The lesson generation engine 122 can repeat the signal(s) with optional audio that instructs the meaning of the signal. The lesson generation engine 122 can continue administering the lesson for a predefined time-period (e.g., 30 minutes or more). The lesson generation engine 122 can then receive the results of a user's performance test 313e. The lesson generation engine 122 can take appropriate action in an instance in which performance test results fail to meet or exceed threshold 315e (e.g., generate a new lesson, modify a lesson, or the like).

Figure 3E:
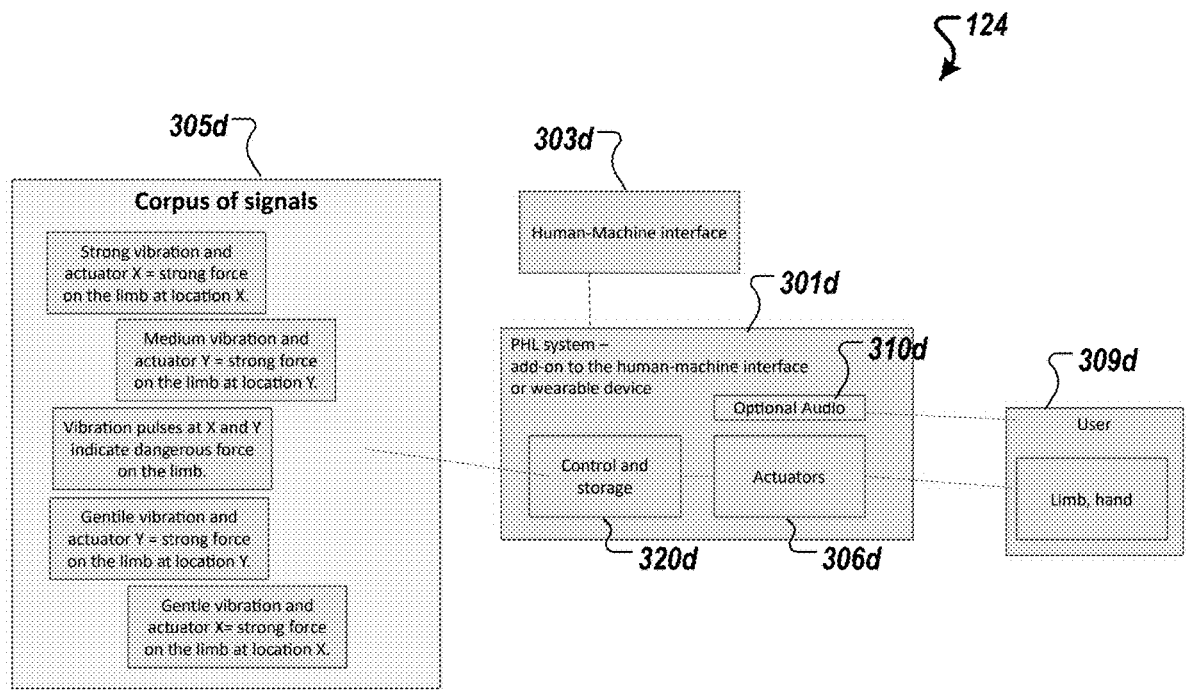

Turning to FIG. 3E, operations of an example score-to-actuation mapping engine 124 are depicted in accordance with exemplary embodiments. The score-to-actuation mapping engine 124 can be part of a simulation system for passive training for the perception of cues. The PHT system 301d can be similar or identical to the cloud infrastructure 107a or 107b described in connection with FIG. 1A and FIG. 1B. In the example shown in FIG. 3E, the PHT system 301d forms an add-on to the human-machine interface 303d or user apparatus 309d (e.g., wearable haptic device or wearable patch). The PHT system 301d includes control and storage 320d, optional audio 310d, and a plurality of actuators 306d. The PHT system 301d can retrieve data from a corpus of signals 305d (e.g., via human-machine interface 303d) and form the data into a digital file. The corpus of signals 305d can be used to produce a lesson for a user at a user apparatus 309d (e.g., wearable device), for example, by generating haptic/tactile outputs at the user's limb or hand(s).

Example Method of Operation for Automatic Lesson Generation

Figure 4A:
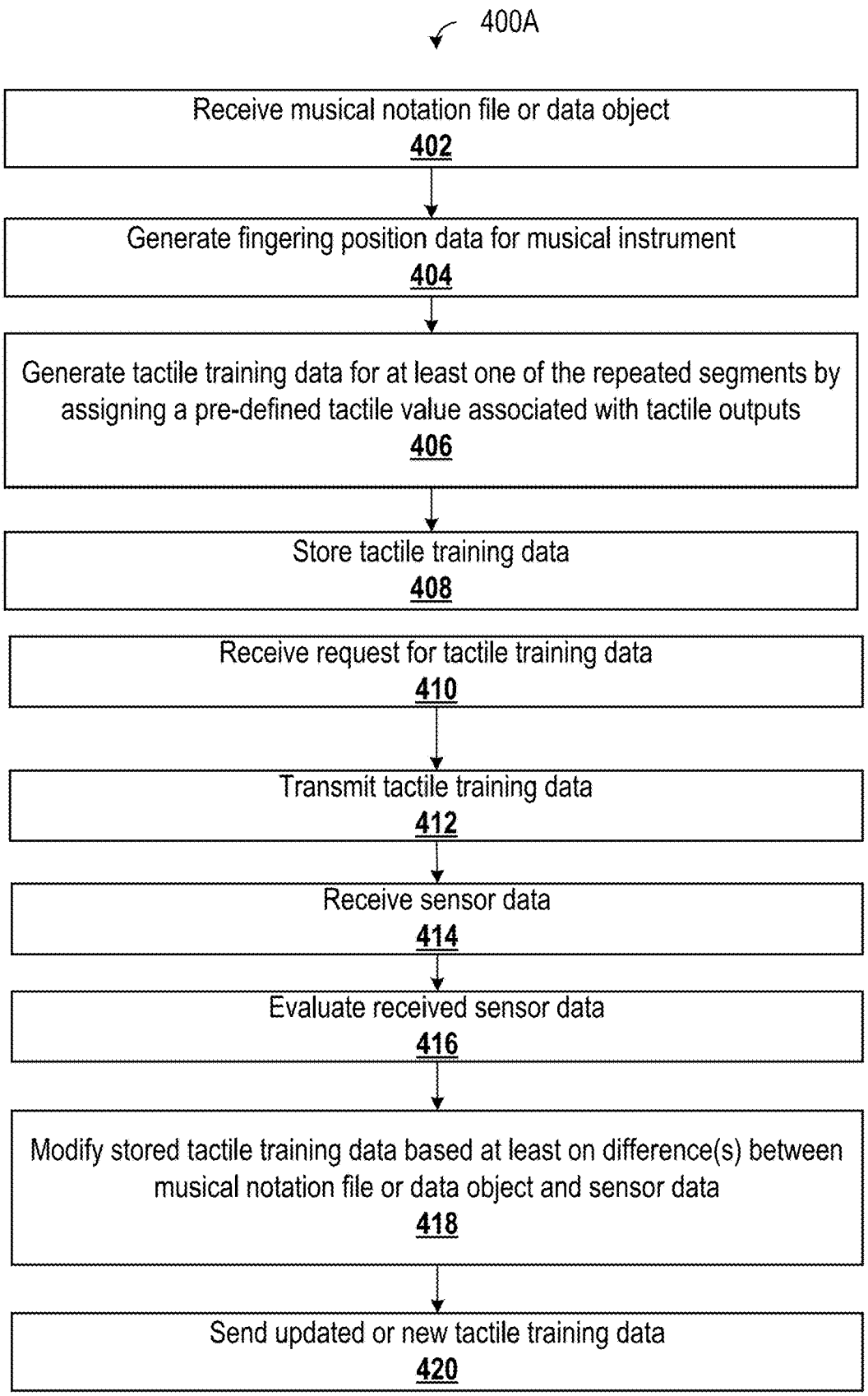
FIG. 4A and FIG. 4B are flowchart diagrams depicting example methods that include generating tactile training data according to exemplary embodiments.
Figure 4B:
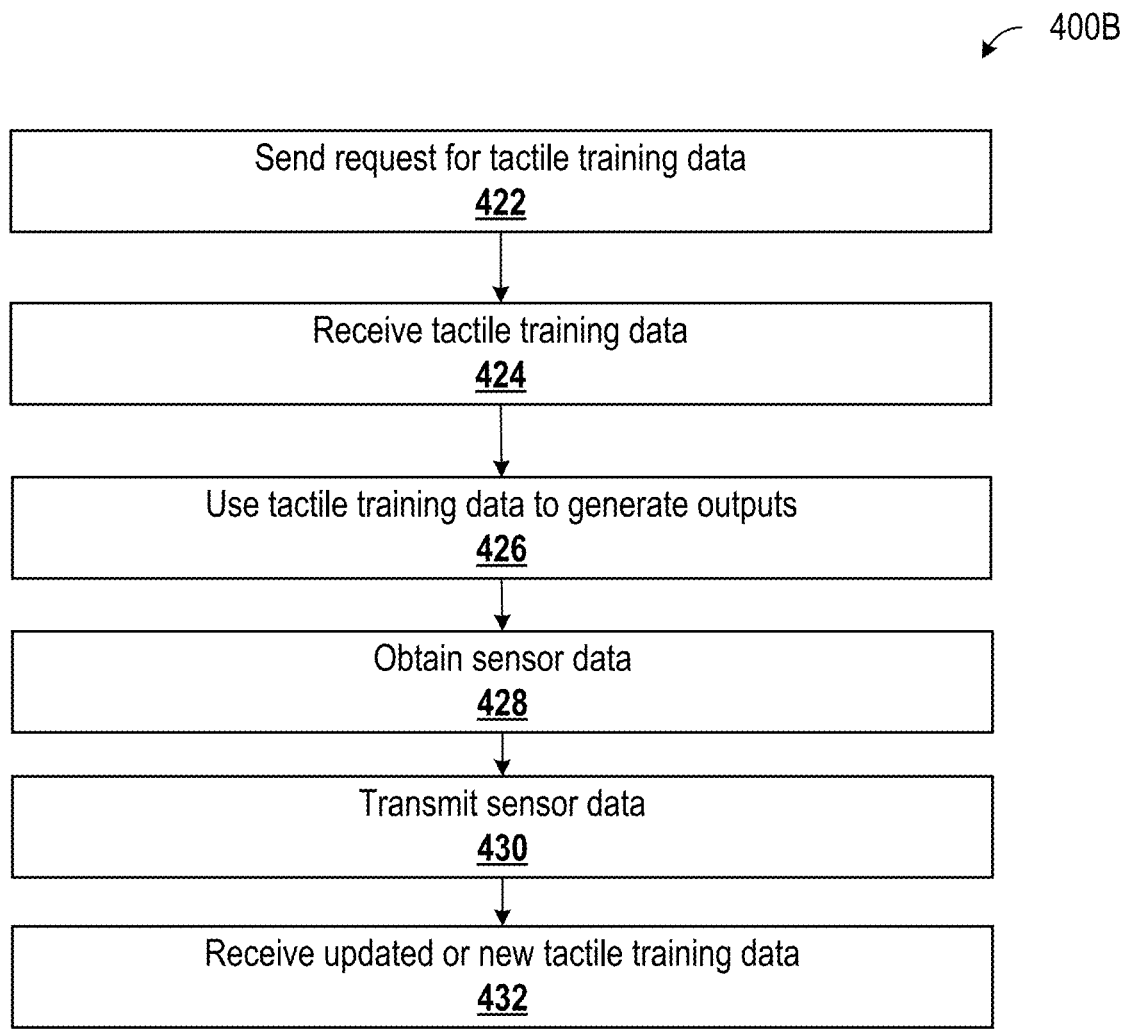

FIG. 4A and FIG. 4B are flowchart diagrams depicting example methods (shown as 400A and 400B) performed by a cloud infrastructure (e.g., 107a) and a wearable haptic device (e.g., 101a) to generate a music lesson that includes generating tactile training data according to exemplary embodiments. Similar operations may be performed for the various applications described herein in addition to musical instruments.

In some examples, the methods may be performed by processing circuitry (for example, but not limited to an application-specific integrated circuit (ASIC), a central processing unit (CPU)). In some examples, the processing circuitry may be electrically coupled to and/or in electronic communication with other circuitries of the example pneumatic vest, such as, but not limited to, one or more sensor arrays, a memory (such as, for example, random access memory (RAM) for storing computer program instructions), and/or a display circuitry.

In some examples, one or more of the procedures described in FIG. 4A and FIG. 4B may be embodied by computer program instructions, which may be stored by a memory (such as a non-transitory memory) of a system employing an embodiment of the present disclosure and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data, and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

Referring now to FIG. 4A, the example method 400A begins at block 402. At block 402, the cloud infrastructure (such as, but not limited to, the cloud infrastructure 107a operatively coupled to the wearable haptic device 101a described in connection with FIG. 1A) receives a musical notation file or data object. For example, the cloud infrastructure can retrieve the musical notation file or data object from a database or another computing entity/server in communication with the cloud infrastructure, or the like.

Segment Identification. At block 404, the cloud infrastructure 107 generates fingering position data for the musical instrument by identifying repeated segments of musical symbols in the musical notation file or data object, e.g., using a trained machine learning model (e.g., neural network) configured to classify the musical symbols as groups of symbols and/or evaluate the musical symbols in the musical notation file or data object using a sliding window operation. The system can generate the fingering position data by determining, (via a score-to-actuation mapping engine 124a discussed in connection with FIG. 1A) at least one repeated segments having a pattern that meets one or more predefined static key constraints (e.g., fingering position or hand size) and/or one or more predefined dynamic key constraints (e.g., hand positioning, hand spread, and/or hand movement information). In some embodiments, generating fingering position data comprises dividing the remaining content in the musical notation file or data object into segments surrounding identified repeated segments.

The trained machine learning model (e.g., neural network) may evaluate a difference between (i) the pitches, rhythms, or chords of the musical notation file or data object and (ii) corresponding pitches, rhythms, or chords of the audio sensor data or video sensor data.

To do so, the score-to-actuation mapping engine 124a may perform (i) divide into lessons, (ii) actuator to action mapping, (iii) context-based assignment of actuators.

Divide into lessons: The cloud infrastructure (e.g., via lesson generation engine 122a) can divide the content in the musical notation file or data object into segments surrounding identified repeated segments. The lesson is configured to set a lesson to have between 10 and 25 stimuli or notes and that maximizes the number of times the lesson window appears in the sheet music.

The range of 10 and 25 stimuli segments was determined through extensive internal testing that tested musical and typing/text entry tasks, stimuli dosage (lesson length) over 6 years involving 5 studies and 60 participants. From the testing, it was determined that lessons of 15-17 actions are successfully trained in periods of 30-60 minutes of training, with 15 actions being the optimal. From the testing, it was observed that shorter sequences irritated users and that songs (or other bodies of knowledge) were being broken up into too many small lessons, thus longer lessons were preferred. For lessons over 25 actions, it was observed that users were unable to learn the lesson even after extended periods of stimulation 60+ minutes and repeated lessons.

Table 1 shows example functions of the lesson generation operations.

TABLE 1

Find repeated sections of notes within a song that are identical or similar. Cut a lesson start at the beginning of such a common musical phrase. This would enhance the power of passive training time by making the patterns learned during one lesson work for several sections of the song. The learning is still valuable if the phrase is slightly changed at other points in the song, as the similarity of the phrases can be used to speed up or shorten time spent when learning other lessons with similar phrases.
Find complex sections of the song and create short lessons. Use rests, volume, or other effect cues in the song to determine the start or end of lessons, as long as lessons are not too long or short.
Design lessons not to have any overlap. Optionally, the system can allow lessons to overlap by some notes.
Find simple sections of the song and create long lessons. These can be stimulated at 2x speed to reduce time spent on simple sections.

Based on the function described in Table 1, if a segment is highly simple or has repeated subsections, then more actions could be permitted in a given lesson. The algorithm can compute a complexity score where each note adds a predefined amount of complexity based on characteristics (e.g., new unique notes in the segment=+1, mandatory hand shifts=+10, chords (simultaneous notes)=+2 for every additional simultaneous note). Then as long as the segment is below a maximum complexity threshold, set in the algorithm as a variable. The segment may exceed 17 notes (but not >26). The complexity score can be used to rank a segment to provide for the sequence of the multiple lessons to be presented to the user.

The system may assign the lesson based on an order paradigms from the teachings (i.e., each lesson once in order that they appear in the song, then lessons 1 and 2 together, then 2 and 3 together . . . ). The algorithm may be hard-coded to order song segments (lessons) in this order and may allow users to move to the next lesson when their performance on the prior lessons is below an error threshold (accurate notes, or accuracy and rhythm).

Assign timings: Table 2 shows timing parameters that can be assigned to stimuli of the function of Table 1. The parameters may be user selected between constant timing or variable timing based on the musical notations.

TABLE 2

| Variable |
|---|
| Keep stimuli representing notes between 100 ms and 1000 ms in duration. |
| Keep gaps between stimuli <200 ms unless there is a rest note. |
| Use a common timing scheme: i.e., 400 ms quarter notes, 800 ms half notes |
| Constant |
| Make all stimuli the same duration and let the student practice timing during active practice. |
| Keep stimuli rapid because stimuli that average over 1000 ms duration or have average pauses between notes of greater than 200 ms will not work. |

The system may also establish a ratio of mixed passive and active learning in the lesson plan to curate time on lessons. For example, the system can provide a recommendation 5:1 between passive and active play; that is 5 units of passive play time for 1 unit of active play/practice time. An example unit may be 30 minutes or 1 hour. Acceptable ratios may be between 1:1 and 7:1. The ratio may be implemented in increments and not necessarily in whole units. The ratio may be adjusted based on feedback data described later herein.

Actuator to action mapping: Following the generation of a lesson, the system is configured, via actuator-to-action mapping, to translate the music or action notations to an actuation (i.e., cue location on the body) to signal different actions. Actuators to the body are designed to deliver stimuli that are understandable to the user as indicative of action or information. This may be usually done by applying an actuator to each finger, at each joint, etc. so that each actuator indicates a body part or a discrete motion (e.g., extend elbow), or to apply actuators in a configuration that conveys continuous motions, sensations, or information. In the actuator-to-action step, information about the apparatus (e.g., digital pin numbers for each stimulation actuator, and the configuration of actuators of the apparatus) may be automatically or manually defined to correspond to the musical notes (or other actions). For example, a glove pair with one actuator per finger (referenced using pins 1-10) may be the apparatus. Then, notes that may be best played with the left index finger are marked as eligible to be cued using the corresponding motor on that finger (pin 4). Some overlap may occur in applications like music, where some of the same notes played by, for example, the left index finger could be played using the left middle finger—thus the system also assigns the left middle finger to these notes (stimulated by the motor at pin 3 in the given example apparatus).

For a musical mapping, the algorithm may assign an initial guess at the best fingering for the song notes (or actions). The system may then form a digital sequence of stimulations (named by the actuator that produces the stimulation, e.g., actuator #3 on the middle finger). The actuator that corresponds to the finger is assigned to be activated in the order of prescribed actions in the sheet music (or other instruction document). For the device, the actuator locations and respective pins (to which the code sends signals) are known. Assignment may be based on contextual rules, including assignment based on neighboring notes in which a sequence of high notes are assigned to neighboring sequential fingers, and jumps to notes distant from the neighboring notes can be assigned to a finger that may have just been used in the previous action.

Some customization for this algorithm step may be performed depending on the instrument/task and the haptic stimulation device being used.

Context-based assignment of actuators: As noted above, assignment may be based on contextual rules. Other context-based assignments may be applied. The system adjusts, for example, the stimulation control sequence using user-specific variables and global rules. An example of a global rule (e.g., for piano or other key instruments) is to minimize hand shifts by minimizing a cost function (heuristic=hand shifts) that takes into account acceptable finger stretch using the hand size variable, perception rules, including a limit on repetitions on a single actuator which causes reduced sensitivity to the stimulation, and similar sections are maximized are found by using the heuristic of maximum repetitions with maximum number of actions per song (file) with less than 5 differences in actions between similar sections.

In some embodiments, the cloud infrastructure (e.g., via score-to-actuation mapping engine 124*a*) utilizes an algorithm that generates an inferred determination or initial guess at the best fingering for notes in a song (actions). For example, the score-to-actuation mapping engine 124*a* can generate or output a digital sequence of stimulations that may be named by the actuator that produces the stimulation (e.g., actuator #3 on the middle finger of a wearable haptic glove). The actuator that corresponds to the finger is assigned to be activated in the order of prescribed actions in the musical notation file (e.g., sheet music or other instruction document). The score-to-actuation mapping engine 124*a* associates the actuator locations and respective pins (to which the code sends signals).

Various customizations for the algorithmic implementation can be provided depending on the instrument/task and the haptic stimulation device being used. In some embodiments, the cloud infrastructure (e.g., assignment scheduler 120*a*) can implement various rules, including some contextual rules. Assignments can be determined based at least in part on neighboring notes. For example, a sequence of high notes can be assigned to neighboring sequential fingers but jumps to notes distant from the neighboring notes can be assigned to a finger that may have just been used in the previous action. Variables can be set by a user through the system's user interface, such as hand size/spread, and the algorithm can be hard-coded to set an internal variable to be used during fingering assignment during tactile training stimuli creation (i.e., hand size=small, spread=7 notes can be reached without shifting the hand position). Then finger assignment is done using a machine learning algorithm with the heuristic of minimizing hand shifts for the given song segment. Other variables (not set by the user) can be used as inputs to the machine learning algorithm, including the starting position of the hand from the prior segment. By way of example, the cloud infrastructure may assign a finger to each note that minimizes hand shifts within a given segment, in view of the hand's starting position from prior song segments and the preset variable for the user's hand size indicating that they can reach, for example, 2 extra keys without shifting.

Referring to FIG. 4A, at block 406, the cloud infrastructure generates tactile training data for at least one of the repeated segments by assigning a predefined tactile value associated with tactile outputs. The tactile training data can comprise a lesson plan for the user. The cloud infrastructure can generate tactile training data for at least one of the repeated segments by assigning (e.g., via assignment scheduler) a predefined tactile value (e.g., high, medium, low) associated with tactile outputs at a wearable haptic device (e.g., haptic glove or wearable patch). The tactile training data can include a replication of at least one of the repeated segments. The cloud infrastructure can divide the remaining content in the musical notation file or data object into segments surrounding the identified repeated segments.

At block 408, the cloud infrastructure then stores the tactile training data in a database or local storage device. The tactile training data can subsequently be used to generate tactile outputs at the wearable haptic device.

Feedback System. In another aspect, the system may receive feedback data comprising at least one of audio sensor data, video sensor data, motion sensor data or bend sensor data obtained during an active training session.

The system may evaluate a difference between (i) the pitches, rhythms, or chords of the musical notation file or data object and (ii) corresponding pitches, rhythms, or chords of the audio sensor data or video sensor data in which the determined difference is used to (i) modify the stored tactile training data for a future lesson or (ii) generate additional tactile training data for a new lesson.

In some embodiments, the step of evaluating the difference includes converting, by the one or more processors, at least a portion of the feedback data into musical symbol data, pitch data, rhythm data, and/or chord data that is compared to the musical symbol data, pitch data, rhythm data, and/or chord data of the musical notation file or data object.

In some embodiments, the step of evaluating the difference includes performing a sequence matching operation on at least a portion of the musical notation file or data object and the feedback data.

Different Haptic Device. To apply or customize the lesson to a given device, the system may use a sensor or sensors to record the haptic signals from the original device or otherwise record the signals from the original device. Then the processor of the new haptic interface (once physically built with actuators capable of physically mimicking the original signals) can translate the recordings into signals produced by the new device by detecting, through signal processing, the timings, frequencies, forces, etc.

Method of Operation of Haptic Stimulation Device

Referring now to FIG. 4B, the example method 400B begins at block 422. At block 422, the wearable haptic device (such as, but not limited to, the wearable haptic device 101a operatively coupled to the cloud infrastructure 107a described in connection with FIG. 1A) sends a request for tactile training data. In some implementations, the wearable haptic device sends the request directly to the cloud infrastructure. In some embodiments, the wearable haptic device sends the request to a user device (such as, but not limited to, the user device 105a described above in connection with FIG. 1A).

At block 410, the cloud infrastructure receives a request for tactile training data (e.g., from the wearable haptic device, user device, or another computing device).

At block 412, the cloud infrastructure sends the requested tactile training data (e.g., to the wearable haptic device, user device, or another computing device).

Returning to FIG. 4B, at block 424, the wearable haptic device receives the tactile training data from the cloud infrastructure (or user device/another computing device).

At block 426, the wearable haptic device uses the tactile training data to generate outputs at the wearable haptic device. The tactile training data can comprise at least one repeated pattern of vibrations or pulses corresponding with a plurality of signals or cues. The tactile training data can further comprise a lesson plan that includes a plurality of lessons for the user to engage in a plurality of active/passive training sessions. The tactile training data can include 10-25 actions, for example 15-17 actions being an optimal duration (for piano) for a passive training session. The number of actions is adjustable based on a measured ratio of passive training sessions to active training sessions. In the example of a system for training the user to improve perception or discrimination, the tactile training data can be used to teach code, deliver a message, train a user to use a prosthetic limb, or the like.

In some examples, the wearable haptic device is configured to store the tactile training data (e.g., in memory 118a) for a predetermined time-period and can periodically send requests for new or updated tactile training data or in response to a user selection. The wearable haptic device can use tactile training data to generate outputs at the wearable haptic device. The wearable haptic device can be configured to adjust the tactile outputs to one of the predefined tactile values (e.g., high, medium, low) for the one or more predefined static key constraints, one or more predefined dynamic key constraints, and/or a plurality of global rules. The predefined static key constraints can be predefined for a lesson tiering so different rules for different complexity/difficulty and song types as defined by the lessons can be provided.

The training can start with one of the lesson order paradigms from the teachings (e.g., each lesson once in the order that they appear in the song, then lessons 1 and 2 together, then 2 and 3 together). The algorithm can be hard-coded to order song segments (lessons) in this order. But only allow users to move to the next lesson when their performance on the prior lessons is below an error threshold (e.g., accurate notes or both accuracy and rhythm). The wearable haptic device can use the tactile training data to stimulate target areas of the user's hands (e.g., dorsal phalanges).

At block 428, the wearable haptic device obtains sensor data or feedback data, for example, audio sensor data, video sensor data, motion sensor data, or bend sensor data obtained during one or more active training sessions (e.g., via the audio/video interface 112a).

At block 430, the wearable haptic device transmits the obtained sensor data or feedback data to the cloud infrastructure (or user device/another computing device).

Returning to FIG. 4A, at block 414, the cloud infrastructure receives the sensor data or feedback data from the wearable haptic device or, in other examples, the user device.

At block 416, the cloud infrastructure evaluates the received sensor data or feedback data. For example, the cloud infrastructure can evaluate a difference between the pitches, rhythms, or chords of the musical notation file or data object and corresponding pitches, rhythms, or chords of audio sensor data, video sensor data, and/or other sensor data. In some implementations, evaluating the difference comprises at least a portion of the feedback data into musical symbol data, pitch data, rhythm data, and/or chord data that is compared to the musical symbol data, pitch data, rhythm data, and/or chord data of the musical notation file or data object. In some implementations, evaluating the difference comprises performing a sequence matching operation (e.g., identifying timing differences and/or alignment differences that meet or exceed a pre-determined threshold) on at least a portion of the musical notation file and/or data object and the feedback data.

At block 418, the cloud infrastructure modifies the tactile training data based at least on the determined difference. For example, the cloud infrastructure can modify stored tactile training data for a future lesson (e.g., modify a stored lesson or lesson order) or generate additional tactile training data for a new lesson.

At block 420, the cloud infrastructure sends new or updated tactile training data to the wearable device (or user device/another computing device).

Returning to FIG. 4B, at block 432, the wearable haptic device receives the new or updated tactile training data and uses it to generate outputs (e.g., during training sessions).

Artificial Intelligence and Machine Learning

As depicted in FIG. 1A, the cloud infrastructure 107a can include one or more trained machine learning models 126a. For example, a trained neural network that is configured to classify (i.e., identify) the musical symbols as groups of symbols and/or a machine learning model configured to evaluate the musical symbols in the musical notation file or data object using a sliding window operation.

The term "artificial intelligence" is defined herein to include any technique that enables one or more computing devices or comping systems (i.e., a machine) to mimic human intelligence. Artificial intelligence (AI) includes, but is not limited to, knowledge bases, machine learning, representation learning, and deep learning. The term "machine learning" is defined herein to be a subset of AI that enables a machine to acquire knowledge by extracting patterns from raw data. Machine learning techniques include, but are not limited to, logistic regression, support vector machines (SVMs), decision trees, Naïve Bayes classifiers, and artificial neural networks. The term "representation learning" is defined herein to be a subset of machine learning that enables a machine to automatically discover representations needed for feature detection, prediction, or classification from raw data. Representation learning techniques include, but are not limited to, autoencoders. The term "deep learning" is defined herein to be a subset of machine learning that enables a machine to automatically discover representations needed for feature detection, prediction, classification, etc., using layers of processing. Deep learning techniques include, but are not limited to, artificial neural networks or multilayer perceptron (MLP).

Machine learning models include supervised, semi-supervised, and unsupervised learning models. In a supervised learning model, the model learns a function that maps an input (also known as feature or features) to an output (also known as target or targets) during training with a labeled data set (or dataset). In an unsupervised learning model, the model learns patterns (e.g., structure, distribution, etc.) within an unlabeled data set. In a semi-supervised model, the model learns a function that maps an input (also known as feature or features) to an output (also known as target or target) during training with both labeled and unlabeled data.

Artificial Neural Networks. An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can be arranged in a plurality of layers such as input layer, output layer, and optionally one or more hidden layers. An ANN having hidden layers can be referred to as deep neural network or multilayer perceptron (MLP). Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tanH, or rectified linear unit (ReLU) function), and provide an output in accordance with the activation function. Additionally, each node is associated with a respective weight. ANNs are trained with a dataset to maximize or minimize an objective function. In some implementations, the objective function is a cost function, which is a measure of the ANN's performance (e.g., error such as L1 or L2 loss) during training, and the training algorithm tunes the node weights and/or bias to minimize the cost function. This disclosure contemplates that any algorithm that finds the maximum or minimum of the objective function can be used for training the ANN. Training algorithms for ANNs include, but are not limited to, backpropagation. It should be understood that an artificial neural network is provided only as an example machine learning model. This disclosure contemplates that the machine learning model can be any supervised learning model, semi-supervised learning model, or unsupervised learning model. Optionally, the machine learning model is a deep learning model. Machine learning models are known in the art and are therefore not described in further detail herein.

A convolutional neural network (CNN) is a type of deep neural network that has been applied, for example, to image analysis applications. Unlike a traditional neural networks, each layer in a CNN has a plurality of nodes arranged in three dimensions (width, height, depth). CNNs can include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by downsampling). A fully-connected layer includes neurons, where each neuron is connected to all of the neurons in the previous layer. The layers are stacked similar to traditional neural networks.

Logistic Regression. A logistic regression (LR) classifier is a supervised classification model that uses the logistic function to predict the probability of a target, which can be used for classification. LR classifiers are trained with a data set (also referred to herein as a "dataset") to maximize or minimize an objective function, for example a measure of the LR classifier's performance (e.g., error such as L1 or L2 loss), during training. This disclosure contemplates that any algorithm that finds the maximum or minimum of the objective function can be used. LR classifiers are known in the art and are therefore not described in further detail herein.

Naïve Bayes. An Naïve Bayes' (NB) classifier is a supervised classification model that is based on Bayes' Theorem, which assumes independence among features (i.e., presence of one feature in a class is unrelated to presence of any other features). NB classifiers are trained with a data set by computing the conditional probability distribution of each feature given label and applying Bayes' Theorem to compute conditional probability distribution of a label given an observation. NB classifiers are known in the art and are therefore not described in further detail herein.

K-NN. A k-NN classifier is a supervised classification model that classifies new data points based on similarity measures (e.g., distance functions). k-NN classifier is a non-parametric algorithm, i.e., it does not make strong assumptions about the function mapping input to output and therefore has flexibility to find a function that best fits the data. k-NN classifiers are trained with a data set (also referred to herein as a "dataset") by learning associations between all samples and classification labels in the training dataset. k-NN classifiers are known in the art and are therefore not described in further detail herein.

Ensemble. An majority voting ensemble is a meta-classifier that combines a plurality of machine learning classifiers for classification via majority voting. In other words, the majority voting ensemble's final prediction (e.g., class label) is the one predicted most frequently by the member classification models. Majority voting ensembles are known in the art and are therefore not described in further detail herein.

EXPERIMENTAL RESULTS AND EXAMPLES

A series of studies were conducted to develop and evaluate active and passive haptic learning systems and methodologies for skill acquisition.

Figure 5:
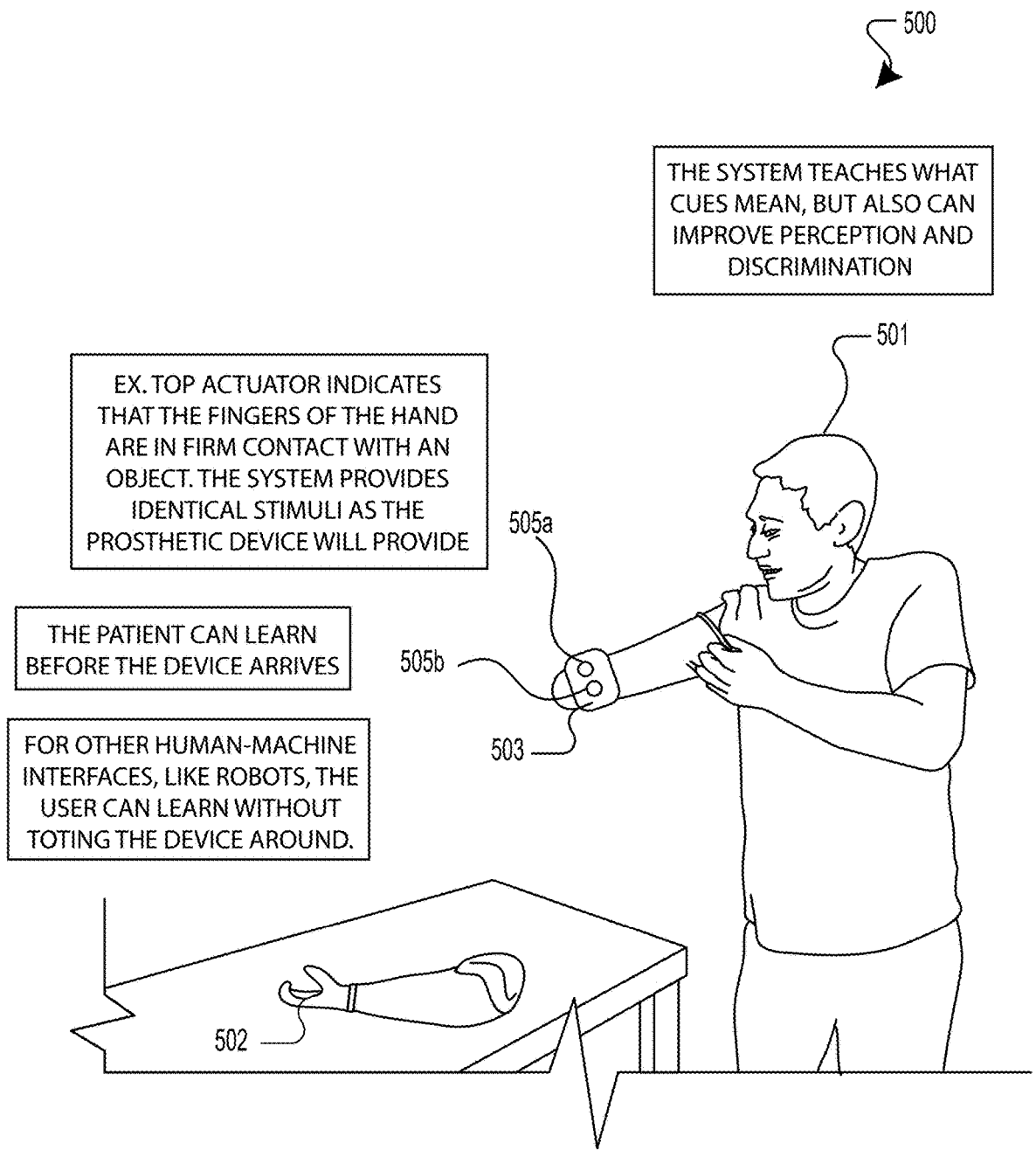
FIG. 5 shows a prototype wearable haptic device according to an illustrative embodiment.

FIG. 5 is a schematic diagram 500 showing a prototype wearable haptic device 503 according to an illustrative embodiment that can be used to train a user 501 to improve perception or discrimination, for example, by teaching the user 501 to recognize or discriminate between various cues. In various implementations, the wearable haptic device 503 is configured to provide identical stimuli as a prosthetic device 502 (e.g., prosthetic limb, leg, or the like).

As illustrated, the wearable haptic device 503 is configured to be worn adjacent to a portion of a user's hand (as shown, near the user's 501 elbow). The wearable haptic device 503 comprise a plurality of actuators including at least a top actuator 505a and a bottom actuator 505b. The top actuator 505a can indicate that the fingers of the user's hand are in firm contact with an object. By way of example, the user 501 can learn to use a prosthetic device 502 prior to it being provided for use. In another example, for other human-machine interfaces, such as robots, the user 501 can learn how to use such interfaces without the physical device.

Passive Piano Learning Framework

Figure 6A:
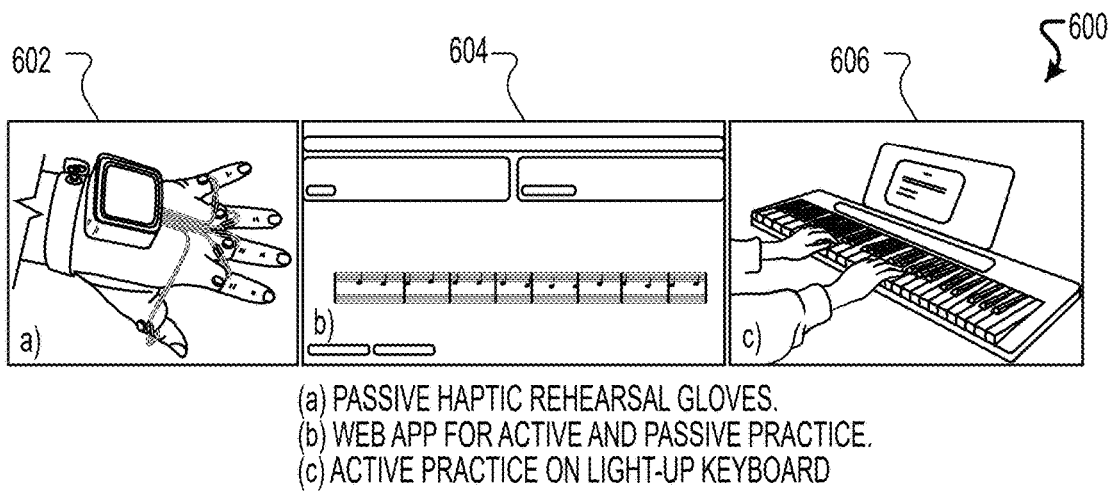
FIG. 6A shows a wearable haptic device, graphic user interface, and musical instrument employed in a study that was conducted.

FIG. 6A is a schematic diagram 600 showing an example wearable haptic device 602, graphic user interface 604, and musical instrument 606 employed in a study that was conducted.

The proposed framework includes a pair of vibrotactile haptic feedback gloves (e.g., wearable haptic device 602), a Bluetooth-capable tablet such as a Samsung Galaxy Tab A8 and a Casio LK-S250 keyboard. The Casio keyboard can illustrate how to play a song using light-up keys and can capture the user's practice sessions using MIDI. We use soft, faux leather driving gloves with sizes varying for each user. The wearable haptic device 602 (PHL gloves) contain five vibration motors (Precision Microdrives 310-103) at the base of the fingers and a 3D-printed case at the back of the palm to protect the electronics from sweat, dust and other damage.

A web app that can be accessed via the graphic user interface 604 was developed that allows users to manage and interact with scores and the selected hardware. Users can interact with a song in a number of ways, such as viewing the sheet music, playing through the song with audio and visual cues, recording their own performances of a song, and taking personal practice notes. All users also have access to songs in a public corpus (e.g., the study curriculum). Users can also upload their own songs as MusicXML files, which are processed and stored in their account. Our software makes heavy usage of the computational musicology library music21 for processing and interacting with digital scores [2].

When new songs are uploaded to the web app, they are processed in two significant ways. First, fingering data is automatically produced for each note in the song, which is necessary for tactile vibrations but not contained in most MusicXML scores. The open source pianoplayer package was used to produce optimal fingering patterns [12]. Second, because passive training works optimally on short segments of 10-17 stimuli, each song is chunked into small "lessons," which are repeated multiple times during passive training. This "chunking" follows the guidelines established by Seim [16].

Figure 6B:
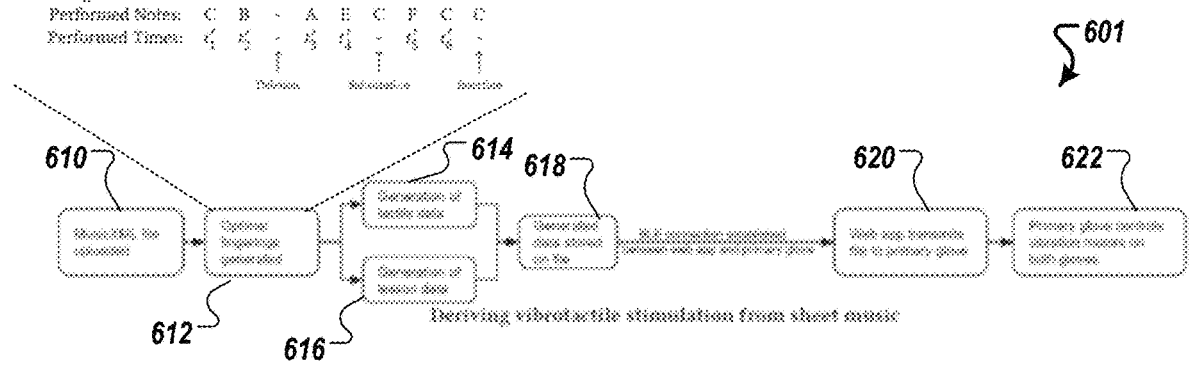
FIG. 6B is a flowchart diagram depicting an example method for deriving vibrotactile stimulation from sheet music according to an illustrative embodiment.

FIG. 6B is a flowchart diagram depicting an example method 601 for deriving vibrotactile stimulation from sheet music according to an illustrative embodiment. The method 601 can be implemented via a PHL system (e.g., PHL system 301a implementing a web app).

At block 610, a MusicXML file is uploaded (e.g., to the web app). The web app allows users to connect the tablet to the PHL gloves over Bluetooth LE or to the keyboard over USB. When connected to the gloves, they can initiate passive training sessions with a variety of parameters such as length of session and number of lesson repeats.

At block 612, optimal fingerings are generated for the MusicXML file, as described in more detail below.

At block 614, tactile data is generated based on the optimal fingering.

Additionally, and/or alternatively, at block 616, lesson data is generated for a user.

At block 618, the generated data is stored in a data file. Subsequently a BLE connection is established between the web app and a primary glove of the PHL gloves.

At block 620, the web app transmits the generated data file to the primary glove.

At block 622, the primary glove controls vibration motors on both gloves to generate vibrotactile stimulation corresponding with the tactile data in accordance with the lesson data.

When connected to the keyboard, they can record and upload their performance of a song, which is then evaluated by our scoring algorithm (discussed below).

Integrating PHL with Active Practice

We restrict active piano lessons to 30 minutes to prevent fatigue, though students are allowed to use whatever active practice techniques they prefer. We incorporate feedback as an incentive and a method of gamifying the learning process. First, the Casio keyboard demonstrates the song to be learned by playing the song and lighting the keys in synchrony. The learner attempts to repeat the score and then proceeds to their active lesson. Afterwards, the keyboard again demonstrates the song, and the learner tries to repeat it. The web app then graphs the student's progress. Feedback immediately after, but not during, the lesson allows students to learn from their mistakes faster and build confidence as they remedy errors. Offering feedback gives the participant a sense of accomplishment and a frame of reference over time, thus encouraging progress [1]. Dual cuing has been shown to greatly improve performance in active learning [6]. During active practice, we display the piano keys and sheet music on the web app while concurrently playing the song. This process increases learning and reduces frustration [17].

In addition to the 30 minute active practice session each day, learners wear the PHL gloves for 2.5 hours. Using vibration motors at the base of each finger, the gloves repeatedly stimulate the user's fingers in the order and rhythm in which the piano keys are played. The gloves are fingerless so as not to interfere with the user's everyday tasks. Since no audio is played and the stimulation is relatively subtle, the user can ignore the gloves. The gloves are self-contained in that they do not need a continuous connection to an external device to operate. The right glove controls the left through Bluetooth LE. Battery life is around three hours.

Testing the learner before and after active sessions also provides data on passive rehearsal. The test at the end of the previous active session provides a baseline to compare to the test at the beginning of the current active session to determine how much "forgetting" has happened between sessions. Without passive stimulation, we expect significant degradation of performance, but in pilot testing with passive rehearsal, learners seem to retain or even improve upon the benefits of their previous active learning session [4].

Performance Evaluation

Figure 6C:
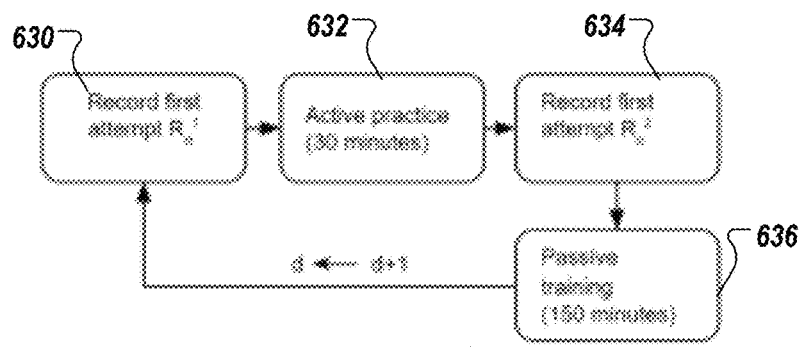
FIG. 6C is a flowchart diagram depicting an example method for measuring progress from active practice and passive rehearsal employed in a study that was conducted.

FIG. 6C is a flowchart diagram depicting an example method 603 for measuring progress from active practice and passive rehearsal employed in a study that was conducted. The method 603 can be implemented via a PHL system (e.g., PHL system 301a).

At block 630, a first attempt, $R^1$, is recorded (e.g., via audio and/or video sensors operatively coupled to wearable haptic gloves).

At block 632, a user engages in active practice for an initial time period (e.g., 30 minutes).

Subsequent to the active practice, at block 633, a second attempt, $R_d^2$, is recorded.

At block 636, the user engages in passive training for a subsequent time period (e.g., 150 minutes)

Thus, sessions are scheduled on a given day d, where progress from an active practice is measured as Eval $(R_d^2)$–Eval $(R_d^1)$ and progress from a passive rehearsal is measured as Eval $(R_{d+1}^1)$–Eval $(R_d^2)$.

To evaluate the performance of a user, the notes played are treated as a temporal sequence P for calculating Eval (P). The Needleman-Wunsch algorithm [13], a dynamic programming algorithm for optimal global sequence alignment, is used for matching the note sequence played to the note sequence in the original piece. Previous work utilized Dynamic Time Warping for sequence alignment which ignores the error of multiple presses of the same key (the error between the key-press sequences "C A A B" and "C A B" is zero) [5, 17]. Needleman-Wunsch is "stricter" when assigning error costs. In addition to alignment errors, we have included a timing error in the new algorithm to measure rhythmic inaccuracies. Once the two sequences are matched, a timing error is applied to matched key presses in which the time difference between user played and original key presses crosses a pre-determined threshold per Table 3.

TABLE 3

| Original Times: | $t_1$ | $t_2$ | — | $t_3$ | $t_4$ | — | $t_5$ | $t_6$ | — |
|---|---|---|---|---|---|---|---|---|---|
| Original Notes: | C | B | B | A | E | E | F | C | — |
| Performed Notes: | C | B | — | A | E | C | F | C | C |
| Performed Times: | $t'_1$ | $t'_2$ | — | $t'_3$ | $t'_4$ | — | $t'_5$ | $t'_6$ | — |
| | | | ↑ Deletion | | | ↑ Substitution | | | ↑ Insertion |

For the above example, assuming m total matched notes and the timing error threshold to be T: Equation 1 shows the timing cost of match notes.

$$\text{Timing Cost} = \sum_{i=0}^{m} 1(|t_i - t'_i| \geq T) \quad \text{(Eq. 1)}$$

Alignment Cost=Deletion cost+Insertion cost+Substitution cost=1+1+1=3. Alignment and timing can be weighted to give an overall evaluation of the performance; with weights Wa and Wt as the weights of alignment cost and timing cost respectively:

Total Cost=$Wa$*Alignment Cost+$Wt$*Timing Cost

Key presses that occur in rapid succession are extracted as chords and treated as unordered sequences.

Example Study. A study was performed that focused on self-paced piano learning, for which hobbyist piano learners who are practicing in their own time without formal piano lessons are recruited. For the study, a pair of songs are chosen from the composer Bartok: Children at Play and Young Men's Dance. The participants have not heard or learned these songs before, and disqualification criteria during recruitment will be if they have learned these songs previously. The songs are of a difficulty level and length such that they are not trivial to learn, but the target subjects should be able to adequately learn them in a two-week period.

The study followed a counter-balanced Latin Square design for four conditions: two each for starting one of two piano pieces and starting with the sham or functional gloves. Over the course of 2 weeks, participants were required to log a total of 3 hours of practice per day: 30 minutes of active practice and 2.5 hours of passive practice. During active practice, subjects have access to the interactive web app, which allows them to view sheet music, play back songs with audio and visual cues and record their own performances. The study does not mandate particular modes of active practice (e.g., scales, repetitions, metronome work, and the like). During passive practice, the subjects wore the PHL gloves and may go about regular daily tasks during the session. The subjects visited the lab three times throughout the study for more in-depth evaluations: once at the beginning of the study, once at the midway point (two weeks), and once at the conclusion. These evaluations consisted of recording their unaided performance of each of our curriculum songs. Likert scale and preference surveys and free responses about their progress are also compared between the conditions. The experiment was designed to be both within-subjects and between subjects.

Each pair were assigned the same song. One learner will be using a fully operational glove while the other will be given a similar glove and be told that the vibrations are set at a level below perception (when in fact they will not be vibrating at all). Using the daily pre and post-active session tests, learning and "forgetting" rates between subjects are compared. After two weeks, the pair are changed to the second song, and the sham and active glove condition are switched. In this manner, the study can compare each participant's performance to themselves between the sham and active conditions. Because of the pairing, participants are recruited and randomized in teams of eight to maintain counterbalancing. An Analysis of Variance test (ANOVA), other statistical tests, and permutation tests was used to determine if the learning rates differ statistically.

DISCUSSION

Passive Haptic Rehearsal for Accelerated Piano Skill Acquisition. Passive haptic learning (PHL) uses vibrotactile stimulation to train piano songs using repetition, even when the recipient of stimulation is focused on other tasks. However, many of the benefits of playing piano cannot be acquired without actively playing the instrument. In this position paper, we posit that passive haptic rehearsal, where active piano practice is assisted by separate sessions of passive stimulation, is of greater everyday use than solely PHL. We propose a study to examine the effects of passive haptic rehearsal for self-paced piano learners and consider how to incorporate passive rehearsal into everyday practice. of parameters such as length of session and number of lesson repeats.

When connected to the keyboard, they can record and upload their performance of a song, which is then evaluated by our scoring algorithm (discussed below).

Playing piano improves mental health and has a positive impact on welfare [11]. However, the learning process can take significant time between learning theory and technique, practicing new piano pieces and rehearsing previously learned ones. Passive haptic learning (PHL) offers an alternative method of rehearsal, speeding the learning process and increasing retention [3].

Previous PHL studies have involved almost entirely passive training, with users only actively playing on a keyboard for evaluation [17]. This research prioritized internal validity, focusing on narrow conditions: simple, short songs, rigid pedagogical methods, and inexperienced students. If PHL is to be a successful piano education tool, it must be usable by real piano students learning complicated songs and engaging in multiple forms of practice through various mediums. We expand upon existing work by integrating passive training into a piano learning program we hope to be suitable for songs and students of all levels. We propose passive haptic rehearsal, in which students learn songs through a combination of active practice and passive training sessions, to reinforce developing skills.

Existing work in piano skill acquisition primarily focuses on learning assisted by a piano instructor. We focus instead on self-paced piano learning where the user learns without any direct human assistance.

Consistent feedback can encourage learners' progress [1], and the process can be gamified by providing more incentives as the learner spends time practicing piano, ensuring continuity and regular practice [14]. New piano interfaces seek to speed learning and reduce the cognitive load demanded by practice. Visual cues, such as light-up keys, new piano notations [15] and finger position tracking [10] have enabled such advances in active learning. Passive learning, in contrast, is "caught, rather than taught" [8] and can enable learning even in the absence of motivation and effort [18]. PHL uses vibrotactile stimulation to teach piano passively using intensive repetition of instructional cues applied directly to the fingers [4]. Surprisingly, learning occurs whether or not the tactile stimulation is accompanied by audio of the notes playing [9]. Early studies extensively compared passive and active learning for piano and confirmed that PHL did not occupy the user's attention during learning [5, 7]. Newer research has expanded from simple melodies to complete, two-handed chorded piano pieces [17]. Furthermore, recent work shows that passively learned note sequences can be recalled with greater accuracy than actively learned sequences when recall is supported by audiovisual cues [3].

CONCLUSION

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an," and "the" include plural referents unless the context clearly dictates otherwise. Ranges may be expressed herein as from "about" or "5 approximately" one particular value and/or to "about" or "approximately" another particular value. When such a range is expressed, other exemplary embodiments include the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

As discussed herein, a "subject" may be any applicable human, animal, or another organism, living or dead, or other biological or molecular structure or chemical environment, and may relate to particular components of the subject, for instance, specific tissues or fluids of a subject (e.g., human tissue in a particular area of the body of a living subject), which may be in a particular location of the subject, referred to herein as an "area of interest" or a "region of interest."

It should be appreciated that, as discussed herein, a subject may be a human or any animal. It should be appreciated that an animal may be a variety of any applicable type, including, but not limited thereto, mammal, veterinarian animal, livestock animal or pet type animal, etc. As an example, the animal may be a laboratory animal specifically selected to have certain characteristics similar to humans (e.g., rat, dog, pig, monkey), etc. It should be appreciated that the subject may be any applicable human patient, for example.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5).

Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

All references cited and discussed in this specification are incorporated herein by reference in their entirety and to the same extent as if each reference was individually incorporated by reference.

REFERENCES

[1] Eugenia Costa-Giomi, Patricia J. Flowers, and Wakaha Sasaki. 2005. Piano Lessons of Beginning Students Who Persist or Drop Out: Teacher Behavior, Student CHI '22, Apr. 29-May 5, 2022, New Orleans, LA, USA Gemicioglu et al. Behavior, and Lesson Progress. *Journal of Research in Music Education* 53, 3 (October 2005), 234-247. https://doi.org/10.1177/002242940505300305 Publisher: SAGE Publications Inc.

[2] Michael Scott Cuthbert and Christopher Ariza. 2010. music21: A toolkit for computer-aided musicology and symbolic music data. (2010).

[3] Rumen Donchev, Erik Pescara, and Michael Beigl. 2021. Investigating Retention in Passive Haptic Learning of Piano Songs. *Proceedings of the ACM on Interactive, Mobile, Wearable and Ubiquitous Technologies* 5, 2 (June 2021), 60:1-60:14. https://doi.org/10.1145/3463513

[4] Kevin Huang, Ellen Yi-Luen Do, and Thad Starner. 2008. PianoTouch: A wearable haptic piano instruction system for passive learning of piano skills. In 2008 $12^{th}$ *IEEE International Symposium on Wearable Computers*. 41-44. https://doi.org/10. 1109/ISWC.2008.4911582 ISSN: 2376-8541.

[5] Kevin Huang, Thad Starner, Ellen Do, Gil Weiberg, Daniel Kohlsdorf, Claas Ahlrichs, and Ruediger Leibrandt. 2010. Mobile music touch: mobile tactile stimulation for passive learning. In *Proceedings of the 28th international conference on Human factors in computing systems-CHI '10*. ACM Press, Atlanta, Georgia, USA, 791. https://doi.org/10.1145/1753326.1753443

[6] Joel J. Katz, Momo Ando, and Melody Wiseheart. 2021. Optimizing song retention through the spacing effect. *Cognitive Research: Principles and Implications* 6, 1 (December 2021), 79. https://doi.org/10.1186/s41235-021-00345-7

[7] Daniel Kohlsdorf and Thad Starner. 2010. Mobile Music Touch: The effect of primary tasks on passively learning piano sequences. In *International Symposium on Wearable Computers (ISWC)* 2010. 1-8. https://doi.org/10.1109/ISWC.2010. 5665877 ISSN: 2376-8541.

[8] Herbert E. Krugman and Eugene L. Hartley. 1970. Passive Learning from Television. *Public Opinion Quarterly* 34, 2 (January 1970), 184-190. https://doi.org/10.1086/267788

[9] Tanya Thais Markow. 2012. *Mobile music touch: using haptic stimulation for passive rehabilitation and learning*. Ph.D. Dissertation. Georgia Institute of Technology.

[10] Karola Marky, Andreas Weiß, Andrii Matviienko, Florian Brandherm, Sebastian Wolf, Martin Schmitz, Florian Krell, Florian Müller, Max Muhlhauser, and Thomas Kosch. 2021. Let's Frets! Assisting Guitar Students During Practice via Capacitive Sensing. In *Proceedings of the 2021 CHI Conference on Human Factors in Computing Systems* (CHI '21). Association for Computing Machinery, New York, NY, USA, 1-12. https://doi.org/10.1145/3411764.3445595

[11] Triona McCaffrey and Jane Edwards. 2016. "Music Therapy Helped Me Get Back Doing": Perspectives of Music Therapy Participants in Mental Health Services. *Journal of Music Therapy* 53, 2 (2016), 121-148. https://doi.org/10.1093/jmt/thw002

[12] Marco Musy. 2022. PianoPlayer. https://github.com/marcomusy/pianoplayer original-date: 2017-10-16T17:25:47Z.

[13] Saul B. Needleman and Christian D. Wunsch. 1970. A general method applicable to the search for similarities in the amino acid sequence of two proteins. *Journal of molecular biology* 48 3 (1970), 443-53.

[14] Linsey Raymaekers, Jo Vermeulen, Kris Luyten, and Karin Coninx. 2014. Game of tones: learning to play songs on a piano using projected instructions and games. In *CHI '14 Extended Abstracts on Human Factors in Computing Systems (CHI EA '14)*. Association for Computing Machinery, New York, NY, USA, 411-414. https://doi.org/10.1145/2559206.2574799

[15] Katja Rogers, Amrei Röhlig, Matthias Weing, Jan Gugenheimer, Bastian Könings, Melina Klepsch, Florian Schaub, Enrico Rukzio, Tina Seufert, and Michael Weber. 2014. P.I.A.N.O.: Faster Piano Learning with Interactive Projection. In *Proceedings of the Ninth ACM International Conference on Interactive Tabletops and Surfaces (ITS '14)*. Association for Computing Machinery, New York, NY, USA, 149-158. https://doi.org/10.1145/2669485.2669514

[16] Caitlyn Seim. 2019. *Wearable vibrotactile stimulation: How passive stimulation can train and rehabilitate*. Ph.D. Dissertation. https://smartech.gatech.edu/handle/1853/61253 Accepted: 2019 May 29 T14:03:08Z Publisher: Georgia Institute of Technology.

[17] Caitlyn Seim, Tanya Estes, and Thad Starner. 2015. Towards Passive Haptic Learning of piano songs. In 2015 *IEEE World Haptics Conference (WHC)*. 445-450. https://doi.org/10.1109/WHC.2015.7177752

[18] Cliff Zukin and Robin Snyder. 1984. Passive Learning: When the Media Environment Is the Message. *Public Opinion Quarterly* 48, 3 (January 1984), 629-638. https://doi.org/10.1086/268864

What is claimed is:

1. A computer-implemented method for generating tactile training data for training a user to learn to play a musical instrument, for use in a therapy or treatment session, and/or to improve perception or discrimination comprising:
   receiving, by one or more processors, a musical notation file or data object having musical symbols that indicate pitches, rhythms, or chords of a song or instrumental musical piece;
   generating, by the one or more processors, fingering position data for a musical instrument by:
      identifying, by the one or more processors, repeated segments of musical symbols in the musical notation file or data object; and
      determining at least one repeated segment having a pattern that meets one or more predefined static key constraints and/or one or more predefined dynamic key constraints;
   generating, by the one or more processors, tactile training data for at least one of the repeated segments by assigning a predefined tactile value associated with tactile outputs at a wearable haptic device, wherein the tactile training data includes a replication of at least one of the repeated segments; and
   storing, by the one or more processors, tactile training data in a database or local storage device, wherein the tactile training data is subsequently used to generate the tactile outputs at the wearable haptic device.

2. The computer-implemented method of claim 1, wherein generating, by the one or more processors, fingering position data for the musical instrument further comprises:
   dividing the remaining content in the musical notation file or data object into segments surrounding the identified repeated segments.

3. The computer-implemented method of claim 1, wherein identifying, by the one or more processors, repeated segments of musical symbols comprises:

processing, by the one or more processors, the musical notation file or data object using a trained machine learning model configured to classify the musical symbols as groups of symbols.

4. The computer-implemented method of claim 1, wherein the one or more predefined static key constraints comprises fingering position or hand size and the one or more predefined dynamic key constraints comprises hand positioning, hand spread, and/or hand movement information.

5. The computer-implemented method of claim 1, wherein the wearable haptic device is configured to adjust the tactile outputs to one of the predefined tactile value for the one or more predefined static key constraints, one or more predefined dynamic key constraints, and a plurality of global rules.

6. The computer-implemented method of claim 1, wherein identifying, by the one or more processors, repeated segments of musical segments comprises:
processing, by the one or more processors, the musical notation file or data object using a trained machine learning model that evaluates the musical symbols in the musical notation file or data object using a sliding window operation.

7. The computer-implemented method of claim 1, further comprising:
receiving, by the one or more processors, feedback data comprising at least one of audio sensor data, video sensor data, motion sensor data or bend sensor data obtained during an active training session;
evaluating, by the one or more processors, a difference between (i) the pitches, rhythms, or chords of the musical notation file or data object and (ii) corresponding pitches, rhythms, or chords of the audio sensor data or video sensor data,
wherein the determined difference is used to (i) modify, by the one or more processors, the stored tactile training data for a future lesson or (ii) generate additional tactile training data for a new lesson.

8. The computer-implemented method of claim 7, wherein evaluating the difference comprises:
converting, by the one or more processors, at least a portion of the feedback data into musical symbol data, pitch data, rhythm data, and/or chord data that is compared to the musical symbol data, pitch data, rhythm data, and/or chord data of the musical notation file or data object.

9. The computer-implemented method of claim 7, wherein evaluating the difference comprises:
performing, by the one or more processors, a sequence matching operation on at least a portion of the musical notation file or data object and the feedback data.

10. The computer-implemented method of claim 1, wherein the tactile training data includes 10-25 actions for a passive training sessions.

11. The computer-implemented method of claim 1, wherein the wearable haptic device comprises one or more gloves that each comprise a set of actuators that are associated with a target location of the user's hand.

12. The computer-implemented method of claim 1, wherein the wearable haptic device comprises one or more wearable devices that each comprise a set of one or more actuators.

13. A system for training a user to learn how to play a musical instrument, for use in a therapy or treatment session, and/or to improve perception or discrimination comprising:
at least one wearable haptic device comprising a plurality of actuators; and
a controller operatively coupled to the at least one wearable haptic device that is configured to:
obtain tactile training data for a user of the at least one wearable haptic device, wherein the tactile training data comprises:
(i) fingering position data for a musical instrument,
(ii) a replication of at least one repeated segment of musical symbols in a musical notation file or data object having symbols that indicate pitches, rhythms, or chords of a song or instrumental musical piece, and
(iii) a predefined tactile value associated with tactile outputs at the wearable haptic device.

14. The system of claim 13, wherein the fingering position data is determined by:
identifying repeated segments of musical symbols in the musical notation file or data object, and
determining at least one repeated segment having a pattern that meets one or more predefined static key constraints and/or one or more predefined dynamic key constraints.

15. The system of claim 14, wherein the one or more predefined static key constraints comprises fingering position or hand size and the one or more predefined dynamic key constraints comprises hand positioning, hand spread, or hand movement information.

16. The system of claim 14, wherein the wearable haptic device is configured to adjust the tactile outputs to one of the predefined tactile values for the one or more predefined static key constraints, one or more predefined dynamic key constraints, and a plurality of global rules.

17. The system of claim 13, wherein the controller is further configured to:
receive feedback data comprising audio sensor data or video sensor data obtained during an active training session;
evaluate a difference between (i) the pitches, rhythms, or chords of the musical notation file or data object and (ii) corresponding pitches, rhythms, or chords of the audio sensor data or video sensor data,
wherein the determined difference is used to (i) modify the stored tactile training data for a future lesson or (ii) generate additional tactile training data for a new lesson.

18. The system of claim 17, wherein evaluating the difference comprises performing a sequence matching operation on at least a portion of the musical notation file or data object and the feedback data.

19. The system of claim 17, wherein the tactile training data includes 10-25 actions.

20. The system of claim 13, wherein the at least one wearable haptic device comprises a first wearable glove comprising a first set of actuators, and a second wearable glove comprising a second set of actuators.

21. The system of claim 20, wherein each actuator is configured to stimulate a target area of the user's hands.

* * * * *